United States Patent
Mandegaran

(10) Patent No.: US 10,530,398 B2
(45) Date of Patent: *Jan. 7, 2020

(54) HYBRID-COUPLER-BASED RADIO FREQUENCY MULTIPLEXERS

(71) Applicant: Qorvo US, Inc., Greensboro, NC (US)

(72) Inventor: Sam Mandegaran, Pasadena, CA (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,550

(22) Filed: Jul. 16, 2019

(65) Prior Publication Data

US 2019/0341945 A1 Nov. 7, 2019

Related U.S. Application Data

(63) Continuation of application No. 15/528,876, filed as application No. PCT/US2016/054646 on Sep. 30, 2016.

(Continued)

(51) Int. Cl.
*H04B 1/00* (2006.01)
*H04B 1/48* (2006.01)
(Continued)

(52) U.S. Cl.
CPC ............ *H04B 1/0057* (2013.01); *H04B 1/48* (2013.01); *H04B 1/52* (2013.01); *H04B 10/5165* (2013.01); *H04L 5/14* (2013.01)

(58) Field of Classification Search
CPC .................................................. H04B 1/0057
See application file for complete search history.

(56) References Cited

U.S. PATENT DOCUMENTS 2,561,212 A   7/1951 Lewis
3,025,463 A   3/1962 Luoma et al.
(Continued)

FOREIGN PATENT DOCUMENTS

CN        2783638 Y    5/2006
DE    102012107877 A1  2/2014
(Continued)

OTHER PUBLICATIONS

International Preliminary Report on Patentability for International Patent Application No. PCT/US2013/074155, dated Jun. 25, 2015, 7 pages.

(Continued)

*Primary Examiner* — Ankur Jain
(74) *Attorney, Agent, or Firm* — Withrow & Terranova, P.L.L.C.

(57) ABSTRACT

A radio frequency (RF) multiplexer includes, for example, a common port, a first port for a first frequency band, a second port for a second frequency band, and a third port for a third frequency band. The RF multiplexer also includes, for example, a first quadrature hybrid coupler (QHC), a second QHC and a third QHC. A coupling of the first QHC, a first pair of filters, and the second QHC separates the first frequency band and the second frequency band from the common port to the first port and to the second port, respectively. A coupling of the first QHC, a second pair of filters, and the third QHC separates the first frequency band and the third frequency band from the common port to the first port and to the third port respectively.

19 Claims, 23 Drawing Sheets

Related U.S. Application Data

(60) Provisional application No. 62/240,229, filed on Oct. 12, 2015.

(51) Int. Cl.
*H04B 1/52* (2015.01)
*H04B 10/516* (2013.01)
*H04L 5/14* (2006.01)

(56) References Cited

U.S. PATENT DOCUMENTS

| | | |
|---|---|---|
| 3,453,638 A | 7/1969 | Hoovler |
| 3,704,409 A | 11/1972 | Oomen |
| 3,800,218 A | 3/1974 | Shekel |
| 4,029,902 A | 6/1977 | Bell, Jr. et al. |
| 4,146,851 A | 3/1979 | Dempsey et al. |
| 4,427,936 A | 1/1984 | Riblet et al. |
| 4,464,675 A | 8/1984 | Balaban et al. |
| 4,489,271 A | 12/1984 | Riblet |
| 4,694,266 A | 9/1987 | Wright |
| 4,721,901 A | 1/1988 | Ashley |
| 4,963,945 A | 10/1990 | Cooper et al. |
| 4,964,945 A | 10/1990 | Calhoun |
| 4,968,967 A | 11/1990 | Stove |
| 5,408,690 A | 4/1995 | Ishikawa et al. |
| 5,483,248 A | 1/1996 | Milroy |
| 5,493,246 A | 2/1996 | Anderson |
| 5,525,945 A | 6/1996 | Chiappetta et al. |
| 5,574,400 A | 11/1996 | Fukuchi |
| 5,691,978 A | 11/1997 | Kenworthy |
| 5,781,084 A | 7/1998 | Rhodes |
| 6,178,310 B1 | 1/2001 | Jeong |
| 6,194,980 B1 | 2/2001 | Thon |
| 6,229,992 B1 | 5/2001 | McGeehan et al. |
| 6,262,637 B1 | 7/2001 | Bradley et al. |
| 6,297,711 B1 | 10/2001 | Seward et al. |
| 6,496,061 B1 | 12/2002 | Bloom et al. |
| 6,580,729 B1 | 6/2003 | Grandchamp et al. |
| 6,721,544 B1 | 4/2004 | Franca-Neto |
| 6,819,302 B2 | 11/2004 | Volman |
| 6,946,847 B2 | 9/2005 | Nishimori et al. |
| 7,072,614 B1 | 7/2006 | Kasperkovitz |
| 7,116,966 B2 | 10/2006 | Hattori et al. |
| 7,123,883 B2 | 10/2006 | Mages |
| 7,250,830 B2 | 7/2007 | Layne et al. |
| 7,283,793 B1 | 10/2007 | McKay |
| 7,330,500 B2 | 2/2008 | Kouki |
| 7,369,811 B2 | 5/2008 | Bellantoni |
| 7,623,005 B2 | 11/2009 | Johansson et al. |
| 7,633,435 B2 | 12/2009 | Meharry et al. |
| 7,636,388 B2 | 12/2009 | Wang et al. |
| 7,711,329 B2 | 5/2010 | Aparin et al. |
| 7,804,383 B2 | 9/2010 | Volatier et al. |
| 7,894,779 B2 | 2/2011 | Meiyappan et al. |
| 8,013,690 B2 | 9/2011 | Miyashiro |
| 8,135,348 B2 | 3/2012 | Aparin |
| 8,149,742 B1 | 4/2012 | Sorsby |
| 8,199,681 B2 | 6/2012 | Zinser et al. |
| 8,385,871 B2 | 2/2013 | Wyville |
| 8,422,412 B2 | 4/2013 | Hahn |
| 8,514,035 B2 | 8/2013 | Mikhemar et al. |
| 8,600,329 B1 | 12/2013 | Comeau et al. |
| 8,620,246 B2 | 12/2013 | McKinzie et al. |
| 8,749,321 B2 | 6/2014 | Kim et al. |
| 8,761,026 B1 | 6/2014 | Berry et al. |
| 8,942,657 B2 | 1/2015 | McKinzie, III et al. |
| 8,957,742 B2 | 2/2015 | Spears et al. |
| 9,048,805 B2 | 6/2015 | Granger-Jones et al. |
| 9,214,718 B2 | 12/2015 | Mow et al. |
| 9,450,553 B2 | 9/2016 | Langer et al. |
| 9,479,214 B2 | 10/2016 | Webb et al. |
| 9,490,866 B2 | 11/2016 | Goel et al. |
| 9,500,727 B2 | 11/2016 | Sohn et al. |
| 9,543,630 B2 | 1/2017 | Tokumitsu et al. |
| 9,590,794 B2 | 3/2017 | Analui et al. |
| 2002/0089396 A1 | 7/2002 | Noguchi et al. |
| 2003/0109077 A1 | 6/2003 | Kim et al. |
| 2004/0000425 A1 | 1/2004 | White et al. |
| 2004/0127178 A1 | 7/2004 | Kuffner |
| 2004/0180633 A1 | 9/2004 | Nakatani et al. |
| 2005/0070232 A1 | 3/2005 | Mages |
| 2005/0245213 A1 | 11/2005 | Hirano et al. |
| 2005/0289632 A1 | 12/2005 | Brooks et al. |
| 2006/0019611 A1 | 1/2006 | Mages |
| 2007/0105509 A1 | 5/2007 | Muhammad et al. |
| 2008/0128901 A1 | 6/2008 | Zurcher et al. |
| 2008/0227409 A1 | 9/2008 | Chang |
| 2008/0240000 A1* | 10/2008 | Kidd ............... H04B 1/0057 370/275 |
| 2008/0261519 A1 | 10/2008 | DeMarco et al. |
| 2009/0054008 A1 | 2/2009 | Satou |
| 2009/0121797 A1 | 5/2009 | Karabatsos |
| 2009/0125253 A1 | 5/2009 | Blair et al. |
| 2009/0252252 A1 | 10/2009 | Kim et al. |
| 2009/0253385 A1 | 10/2009 | Dent et al. |
| 2009/0289744 A1 | 11/2009 | Miyashiro |
| 2010/0002620 A1 | 1/2010 | Proctor, Jr. et al. |
| 2010/0084146 A1 | 4/2010 | Roberts |
| 2010/0109771 A1 | 5/2010 | Baik et al. |
| 2010/0127795 A1 | 5/2010 | Bauer et al. |
| 2010/0134700 A1 | 6/2010 | Robert et al. |
| 2010/0148886 A1 | 6/2010 | Inoue et al. |
| 2010/0177917 A1 | 7/2010 | Van Der Werf |
| 2010/0323654 A1 | 12/2010 | Judson et al. |
| 2011/0069644 A1 | 3/2011 | Kim et al. |
| 2011/0080229 A1 | 4/2011 | Kenington |
| 2011/0080856 A1 | 4/2011 | Kenington |
| 2011/0134810 A1 | 6/2011 | Yamamoto et al. |
| 2011/0140803 A1 | 6/2011 | Kim et al. |
| 2011/0227664 A1 | 9/2011 | Wyville |
| 2011/0256857 A1 | 10/2011 | Chen et al. |
| 2012/0007605 A1* | 1/2012 | Benedikt ............... G01R 27/32 324/612 |
| 2012/0063496 A1 | 3/2012 | Giannini et al. |
| 2012/0075069 A1 | 3/2012 | Dickey et al. |
| 2012/0094617 A1 | 4/2012 | Tone et al. |
| 2012/0099624 A1 | 4/2012 | Nagaya et al. |
| 2012/0140860 A1 | 6/2012 | Rimini et al. |
| 2012/0154071 A1 | 6/2012 | Bradley et al. |
| 2012/0161784 A1 | 6/2012 | Benedikt |
| 2012/0163245 A1 | 6/2012 | Tone et al. |
| 2012/0194269 A1 | 8/2012 | Schlager et al. |
| 2012/0201153 A1 | 8/2012 | Bharadia et al. |
| 2012/0201173 A1 | 8/2012 | Jain et al. |
| 2012/0212304 A1 | 8/2012 | Zhang et al. |
| 2012/0230227 A1 | 9/2012 | Weiss |
| 2013/0010654 A1 | 1/2013 | Kushnir |
| 2013/0016634 A1 | 1/2013 | Smiley |
| 2013/0063299 A1 | 3/2013 | Proudkii |
| 2013/0065542 A1 | 3/2013 | Proudkii |
| 2013/0079641 A1 | 3/2013 | Zwirn |
| 2013/0083703 A1 | 4/2013 | Granger-Jones et al. |
| 2013/0109330 A1 | 5/2013 | Sahota et al. |
| 2013/0113576 A1 | 5/2013 | Inoue et al. |
| 2013/0130619 A1 | 5/2013 | Harverson et al. |
| 2013/0154887 A1 | 6/2013 | Hein et al. |
| 2013/0190036 A1 | 7/2013 | Zhao et al. |
| 2013/0201880 A1 | 8/2013 | Bauder et al. |
| 2013/0201881 A1 | 8/2013 | Bauder et al. |
| 2013/0201882 A1 | 8/2013 | Bauder et al. |
| 2013/0222059 A1 | 8/2013 | Kilambi et al. |
| 2013/0241655 A1 | 9/2013 | Liss et al. |
| 2013/0241656 A1 | 9/2013 | Tajima et al. |
| 2013/0241669 A1 | 9/2013 | Mikhemar et al. |
| 2013/0242809 A1 | 9/2013 | Tone et al. |
| 2013/0245976 A1 | 9/2013 | Hind |
| 2013/0287144 A1 | 10/2013 | Paulin et al. |
| 2013/0301488 A1 | 11/2013 | Hong et al. |
| 2013/0321097 A1 | 12/2013 | Khlat et al. |
| 2014/0103946 A1 | 4/2014 | Vanden Bossche |
| 2014/0140860 A1 | 5/2014 | Tibbott et al. |
| 2014/0154981 A1 | 6/2014 | Nakatani |
| 2014/0169236 A1 | 6/2014 | Choi et al. |
| 2014/0194073 A1 | 7/2014 | Wyville et al. |

(56) References Cited

U.S. PATENT DOCUMENTS

| | | |
|---|---|---|
| 2014/0204808 A1 | 7/2014 | Choi et al. |
| 2014/0348018 A1 | 11/2014 | Bharadia et al. |
| 2014/0376419 A1 | 12/2014 | Goel et al. |
| 2015/0049841 A1 | 2/2015 | Laporte et al. |
| 2015/0118978 A1* | 4/2015 | Khlat .................... H04B 1/52 455/83 |
| 2015/0163044 A1 | 6/2015 | Analui et al. |
| 2015/0236390 A1 | 8/2015 | Analui et al. |
| 2015/0236395 A1 | 8/2015 | Analui et al. |
| 2015/0236842 A1 | 8/2015 | Goel et al. |
| 2016/0050031 A1 | 2/2016 | Hwang et al. |
| 2016/0134325 A1 | 5/2016 | Tageman et al. |
| 2016/0204821 A1 | 7/2016 | Han et al. |
| 2016/0211870 A1 | 7/2016 | Wu et al. |
| 2016/0380706 A1 | 12/2016 | Tanzi et al. |
| 2017/0030339 A1 | 2/2017 | Proudfoot |
| 2017/0070368 A1 | 3/2017 | Mandegaran |
| 2018/0083591 A1 | 3/2018 | Mandegaran |
| 2018/0309464 A1 | 10/2018 | Mandegaran |

FOREIGN PATENT DOCUMENTS

| | | | |
|---|---|---|---|
| EP | 1091497 | A1 | 4/2001 |
| EP | 2960981 | A1 | 1/2014 |
| EP | 2733855 | A1 | 5/2014 |
| EP | 2814172 | A1 | 12/2014 |
| JP | 2012089995 | A | 5/2012 |
| JP | 2012095058 | A | 5/2012 |
| KR | 10-2010-0134324 | A | 12/2010 |
| WO | 9515018 | A1 | 6/1995 |
| WO | 0052841 | A1 | 9/2000 |
| WO | 2014032883 | A1 | 3/2014 |
| WO | 2014133625 | A2 | 9/2014 |
| WO | 2015089091 | A1 | 6/2015 |
| WO | 2016063108 | A1 | 4/2016 |

OTHER PUBLICATIONS

International Preliminary Report on Patentability for International Patent Application No. PCT/US2014/069372, dated Jun. 23, 2016, 8 pages.
International Preliminary Report on Patentability for International Patent Application No. PCT/US2015/015930, dated Aug. 25, 2016, 8 pages.
International Preliminary Report on Patentability for International Patent Application No. PCT/US2015/016145, dated Aug. 25, 2016, 6 pages.
International Preliminary Report on Patentability for International Patent Application No. PCT/US2015/016642, dated Sep. 1, 2016, 9 pages.
International Search Report and Written Opinion for International Patent Application No. PCT/US2016/54646, dated Dec. 29, 2016.
International Preliminary Report on Patentability for International Patent Application No. PCT/US2016/54646, dated Dctober 5, 2017, 5 pages.
International Search Report and Written Opinion for International Patent Application No. PCT/US2017/052699, dated Dec. 4, 2017, 8 pages.
International Preliminary Report on Patentability for International Patent Application No. PCT/US2017/052699, dated Apr. 4, 2019, 8 pages.
Notification of Reasons for Refusal for Japanese Patent Application No. 2015-547473, dated Mar. 2, 2017, 6 pages.
The First Office Action for Chinese Patent Application No. 201480067651.0, dated Jun. 22, 2018, 27 pages.
The First Office Action for Chinese Patent Application No. 201580009478.3, dated Dec. 27, 2018, 34 pages.
Notice of Allowance for U.S. Appl. No. 15/528,876, dated Nov. 7, 2018, 8 pages.
Notice of Allowance for U.S. Appl. No. 15/528,876, dated Mar. 6, 2019, 9 pages.
Non-Final Office Action for U.S. Appl. No. 15/711,692, dated Dec. 13, 2018, 17 pages.
Final Office Action for U.S. Appl. No. 15/711,692, dated Apr. 11, 2019, 21 pages.
Notification of the First Office Action for Chinese Patent Application No. 201680059896.8, dated Apr. 2, 2019, 11 pages.
Hunter, Ian, et al., "Passive Microwave Receive Filter Networks Using Low-Q Resonators," IEEE Microwave Magazine, Sep. 2005, IEEE, pp. 46-53.
Kannangara, Shyama, et al., "Analysis of an Adaptive Wideband Duplexer With Double-Loop Cancellation," IEEE Transactions on Vehicular Technology, vol. 56, Issue 4, Jul. 2007, pp. 1971-1982.
Laforge, Paul, et al., "Diplexer Design Implementing Highly Miniaturized Multilayer Superconducting Hybrids and Filters," IEEE Transactions on Applied Superonductivity, vol. 19, Issue 2, Apr. 2009, pp. 47-54.
Marcatili, E.A., et al., "Band-Splitting Filter," Bell System Technical Journal, Jan. 1961, pp. 197-212.
Matthaei, et al. "Microwave Filters, Impedance-Matching Networks, and Coupling Structures," Chapter 14: Directional, Channel-Separation Filters and Traveling-WAve Ring-Resonators, 1980, McGraw-Hill, pp. 843-887.
Matthaei, et al., "Microwave Filters, Impedance-Matching Networks, and Coupling Structures," Chapter 16: Multiplexer Design, McGraw Hill, 1980, pp. 965-1000.
Phudpong, Padison, et al., "Nonlinear Matched Reflection Mode Bandstop Filters for Frequency Selective Limiting Applications," Microwave Symposium Conference, IEEE/MTT-S International, 2007, IEEE, pp. 1043-1046.
International Search Report and Written Opinion for International Patent Application No. PCT/US2013/074155, dated Sep. 23, 2014, 10 pages.
International Search Report and Written Opinion for International Patent Application No. PCT/US2014/069372, dated Mar. 3, 2015, 9 pages.
International Search Report and Written Opinion for International Patent Application No. PCT/US2015/015930, dated May 27, 2015, 9 pages.
International Search Report and Written Opinion for International Patent Application No. PCT/US2015/016145, dated May 20, 2015, 6 pages.
International Search Report and Written Opinion for International Patent Application No. PCT/US2015/016642, dated Jun. 25, 2015, 9 pages.
Extended European Search Report for European Patent Application No. 13876497.2, dated Jul. 4, 2016, 7 pages.
Non-Final Office Action for U.S. Appl. No. 14/102,244, dated Jun. 15, 2015, 18 pages.
Final Office Action for U.S. Appl. No. 14/102,244, dated Sep. 22, 2015, 19 pages.
Notice of Allowance for U.S. Appl. No. 14/102,244, dated Jul. 20, 2016, 10 pages.
Notice of Allowance for U.S. Appl. No. 14/565,752, dated Nov. 4, 2016, 7 pages.
Notice of Allowance for U.S. Appl. No. 14/622,627, dated Feb. 16, 2017, 7 pages.
Notice of Allowance for U.S. Appl. No. 14/622,627, dated Aug. 14, 2017, 7 pages.
Non-Final Office Action for U.S. Appl. No. 14/622,627, dated May 20, 2016, 9 pages.
Non-Final Office Action for U.S. Appl. No. 14/624,289, dated Nov. 4, 2016, 13 pages.
Final Office Action for U.S. Appl. No. 14/624,289, dated Mar. 3, 2017, 17 pages.
Non-Final Office Action for U.S. Appl. No. 14/624,289, dated Aug. 10, 2017, 23 pages.
Final Office Action for U.S. Appl. No. 14/624,289, dated Mar. 30, 2018, 19 pages.
Notice of Allowance for U.S. Appl. No. 14/624,289, dated Feb. 19, 2019, 7 pages.
Non-Final Office Action for U.S. Appl. No. 14/626,572, dated Jul. 29, 2015, 22 pages.

(56) References Cited

OTHER PUBLICATIONS

Final Office Action for U.S. Appl. No. 14/626,572, dated Mar. 31, 2016, 21 pages.
Non-Final Office Action for U.S. Appl. No. 14/626,572, dated Jul. 15, 2016, 22 pages.
Final Office Action for U.S. Appl. No. 14/626,572, dated Feb. 16, 2017, 12 pages.
Notice of Allowance for U.S. Appl. No. 15/528,876, dated Jul. 3, 2019, 8 pages.
Advisory Action for U.S. Appl. No. 15/711,692, dated May 31, 2019, 3 pages.
Notification of the Second Office Action for Chinese Patent Application No. 201580009478.3, dated Jul. 17, 2019, 11 pages.
Notification of the First Office Action for Chinese Patent Application No. 2017900013920, dated Sep. 27, 2019, 3 pages.
Notice of Allowance for U.S. Appl. No. 14/624,289, dated Sep. 11, 2019, 8 pages.
Non-Final Office Action for U.S. Appl. No. 15/711,692, dated Nov. 4, 2019, 23 pages.

* cited by examiner

HYBRID-COUPLER-BASED RADIO FREQUENCY MULTIPLEXERS

CROSS-REFERENCE TO RELATED APPLICATIONS/INCORPORATION BY REFERENCE

This application is a continuation of U.S. patent application Ser. No. 15/528,876, filed on May 23, 2017, which is a 371 of International Application No. PCT/US2016/054646, filed on Sep. 30, 2016, which makes reference to, claims priority to, and claims benefit from U.S. Provisional Application No. 62/240,229, filed on Oct. 12, 2015. The above-referenced applications are hereby incorporated herein by reference in their entireties.

FIELD OF THE DISCLOSURE

Certain embodiments of the present disclosure relate to electromagnetic components, integrated circuits, and/or wireless communication devices and systems. More specifically, certain embodiments of the present disclosure relate to methods and systems that use hybrid-coupler-based radio frequency (RF) multiplexers.

BACKGROUND OF THE DISCLOSURE

Existing methods and systems for RF multiplexers can be costly, cumbersome and inefficient. Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

Systems and/or methods that use hybrid-coupler-based radio frequency (RF) multiplexers, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated.

DETAILED DESCRIPTION OF THE DISCLOSURE

Figure 1A:
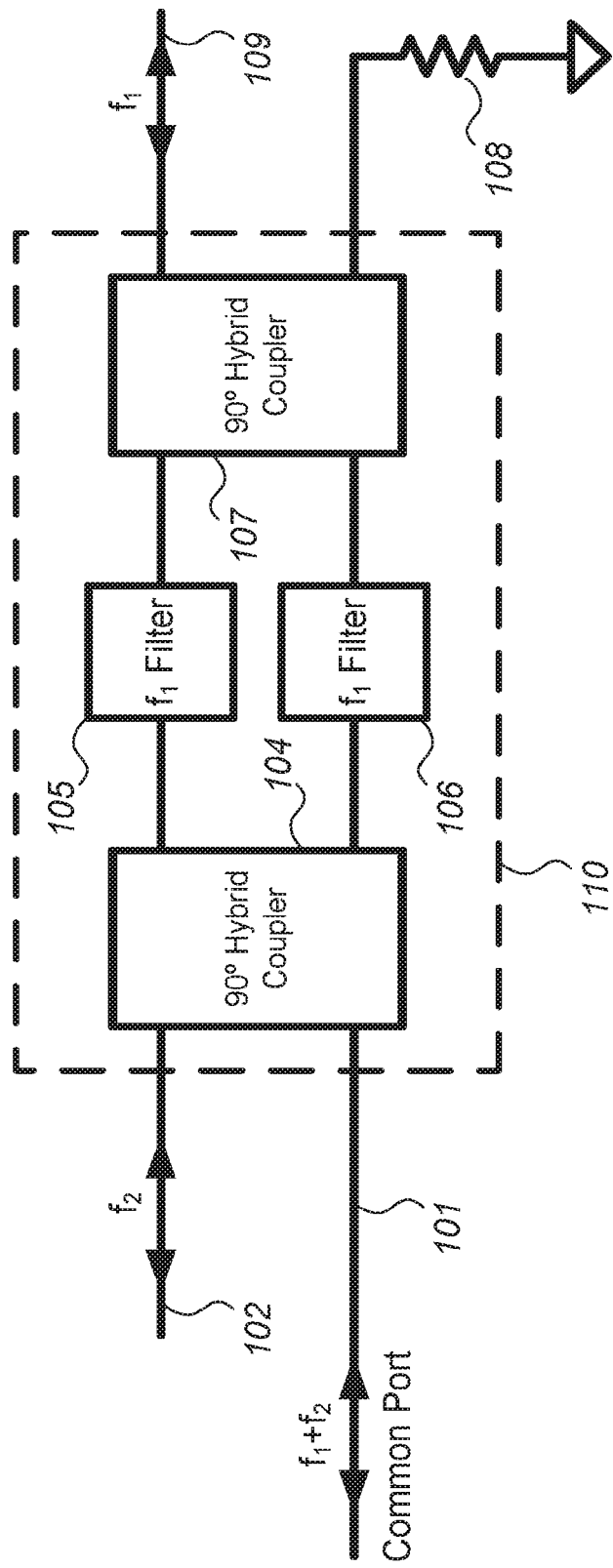
FIG. 1A illustrates an embodiment of a duplexer according to the present disclosure that supports two frequency bands, where band 1 is centered at frequency $f_1$, and band 2 is centered at frequency $f_2$.

As utilized herein the terms "circuit" and "circuitry" refer to physical electronic components (i.e., hardware) and any software and/or firmware ("code") which may configure the hardware, be executed by the hardware, and/or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g." and "for example" set off lists of one or more non-limiting examples, instances, or illustrations.

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated.

Some embodiments according to the present disclosure contemplate that, in electronic communications, in order to correctly receive a desired signal, the desired signal is separated from many other signals that are present on the same medium. This is applicable to wired communication systems and/or wireless communication systems. In the case of wireless communication systems, for example, the task of separating the desired signal from other signals can be a substantial challenge since it might not be known what other signals are present in the air which may interfere with the receive circuitry. Further, the transmitter may also interfere with the receive circuitry since the transmitter sits on the same system as the receive circuitry and operates at a frequency very close to the desired receive frequency. There are many techniques to isolate a receiver from a transmitter.

Some embodiments according to the present disclosure contemplate using a duplexer, for example, and to achieve isolation between the transmitter and the receiver. An exemplary duplexer can use, for example, a pair of quadrature hybrid couplers (QHC) and filters for the desirable frequency bands.

As demand for higher bandwidths and better connectivity continues to grow, interest in carrier aggregation has increased. In carrier aggregation, a wireless device may receive the desired information at different frequency bands (or channels) and/or may transmit the information at different frequency bands (or channels).

In some embodiments of the present disclosure, a component that separates different frequencies or frequency bands is called a multiplexer. An RF multiplexer, in its simplest form, is a 1×N passive network including 1 nominal input and N nominal output ports (N is a positive integer) where each output corresponds to a specific frequency band. In other words, the transfer function from the input to each of the N outputs resembles a filter tuned to a specific frequency band. Furthermore, it is often desirable that the output ports of the multiplexer are isolated. In other words, the transfer functions from each of the output port to every other output port should have a small magnitude at the frequency bands corresponding to those two ports.

Some embodiments of the present disclosure provide 1×N RF multiplexers that include RF band-pass filters (BPF) with distinct passband frequencies that are connected to a common port using a passive network or a number of passive networks. The passive network or networks can ensure proper impedance at all frequency bands of interest and may assist in enhancing the frequency response.

In some embodiments of the present disclosure, an input port of an RF multiplexer may correspond to an antenna interface and the output ports may correspond to receive or transmit frequency bands.

In some embodiments of the present disclosure, a duplexer may be considered a multiplexer with N=2. In other words, a duplexer is a three-port device. A duplexer can be used, for example, in wireless communication systems supporting frequency division duplexing (FDD).

Some embodiments of the present disclosure contemplate that the requirements for RF filters and multiplexers have become more stringent in light of new communication standards where information channels and frequency bands are closer to each other; new communication devices such as smartphones where the footprint and cost of all components are getting smaller as more components are used in support of multiple standards and applications; and co-existing communication systems where multiple communication transmitters and receivers work simultaneously.

Some embodiments of the present disclosure contemplate that linearity, noise, and power handling requirements might lead to utilization of passive RF filters and multiplexers in many applications. The performance of passive RF filters may be limited by the quality factor (Q) of the components that are used in their realization. The filter selectivity as well as passband requirement may lead to a filter topology and filter order. For a given RF filter topology and order, insertion loss may reduce with the increase of component Q.

Some embodiments of the present disclosure contemplate various technologies can be used to realize passive RF filters and duplexers. For instance, capacitors, inductors, or transmission lines can be used to realize passive RF filters and duplexers. Electromagnetic resonators, including waveguide, air cavity, and dielectric (e.g., ceramic) resonators, can also be used to realize passive filters and duplexers. The quality factor of such components is proportional to their overall physical size. As such, it has been difficult to realize compact low-loss selective passive RF filters and duplexers using electromagnetic components and resonators.

In some embodiments of the present disclosure, piezoelectric material can be used to realize compact high-Q resonators. Surface acoustic wave (SAW) resonators can provide compact low-loss selective RF filters and duplexers. Bulk acoustic wave (BAW) resonators can also be used to construct high-performance RF filters and duplexers.

Micro-electro-mechanical system (MEMS) resonators with high quality factor can also be used in radio frequency filtering applications.

In some embodiments of the present disclosure, RF SAW filters and duplexers can be used in wireless communications such as cellular phones, wireless local area network (WLAN) transceivers, global positioning system (GPS) receivers, cordless phones, and so forth. RF SAW filters have been used as band-select filters, image-reject filters, intermediate frequency (IF) filters, transmitter noise or spur reduction filters, and so forth. A smartphone may have several SAW resonators, SAW filters, and SAW multiplexers to support various communication systems and standards.

Some embodiments of the present disclosure provide resonators (e.g., BAW resonators) that have lower loss (or higher Q) or are more compact, especially at higher frequencies, compared with SAW resonators, for example. Therefore, RF filters and duplexers that use BAW resonators can have lower insertion loss, or higher selectivity, or smaller form factor compared with those that utilize SAW resonators, especially at higher frequencies. Thin film bulk acoustic resonators (FBAR) and bulk acoustic wave solidly mounted resonator (BAW SMR) are exemplary examples of BAW resonators.

In commercial systems, some embodiments of the present disclosure contemplate that the choice of technology may depend on the technical performance, such as power consumption as well as economic and business considerations such as cost, size, and time to market. For instance, while one technology may provide better performance compared with another technology, it might not be adopted for a commercial system that is cost sensitive. In the case of RF filters and duplexers, it may be desirable to use a technology that leads to the lower cost and/or more compact solution, as long as a predetermined performance criterion is met. In other words, a more expensive or larger solution might not be adopted, even if it provides better performance as compared with an alternative solution that meets an acceptable performance level at a lower cost and/or size. For instance, while RF filters and multiplexers that use BAW resonators may provide lower loss compared with RF filters and multiplexers that use SAW resonators for a given set of specifications, the higher relative cost of BAW technology, as well as its relatively smaller number of suppliers, might disfavor their usage in certain applications and standards. Other considerations may include, for example, the ease of integration with the rest of the components in a communication system. For instance, there may be performance, business, or economic advantages for integrating RF filters and multiplexers with low noise amplifiers (LNAs), power amplifiers (PAs), transmit/receive (T/R) or band-select switches, impedance matching networks, etc. A wireless communication device, such as a smartphone, can include a number of SAW filters and multiplexers as well as a number of BAW filters and duplexers. Each SAW filter or BAW filter or duplexer may be used for a specific communication application, standard, or frequency band.

Some embodiments of the present disclosure provide architectural solutions that enable realization of highly-selective, low-loss multiplexers with high-isolation between the ports. Some embodiments of the present disclosure use a lower cost or more compact technology within an innovative architecture that satisfies a comparable or better specification compared to what can be achieved using a more expensive or less compact technology. Exemplary embodiments might include replacing BAW multiplexers with SAW multiplexers using an innovative architecture, or replacing ceramic or cavity multiplexers with BAW multiplexers using an innovative architecture.

Some embodiments of the present disclosure provide architectural solutions that enable realization of tunable, reconfigurable, and/or programmable RF multiplexers that can satisfy the requirements of multi-standard communication systems.

Some embodiments of the present disclosure overcome technical difficulties related to using QHCs and filters as described in U.S. Pat. Nos. 3,453,638 and 4,029,902, which are incorporated by reference herein in their entirety. Some technical difficulties overcome by some embodiments of the present disclosure include, for example, incurring extra loss and non-idealities as additional sub-circuits are cascaded to support additional frequency bands, where the extra loss and non-idealities are based on, for example, the signal at some frequency bands traveling through several QHCs and being reflected from several filters before reaching a desired output.

Some embodiments of the present disclosure overcome technical difficulties related to using QHCs and filters in a tunable duplexer as described in U.S. Pat. No. 9,048,805, which is incorporated by reference herein in its entirety. Some technical difficulties overcome by some embodiments of the present disclosure include, for example, an extra QHC and an extra pair of filters on one side of the QHC and a single filter on the other side of the QHC to achieve carrier aggregation for three bands. Because the output of the antenna tuner is connected to two QHCs, impedance matching becomes a challenge if not impossible. Further, each one of the receive frequency bands is split into two. One half of that incoming signal never reaches the intended output and thus only half of the power of the incoming signal is usable.

In wireless communication, it can be desirable to receive and transmit, or operate at two frequency bands, at the same time using one antenna. To accomplish this, some embodiments of the present disclosure provide that circuitry is used to send most of the incoming signal from the antenna to the receiver, and send most of the outgoing signal from the transmitter to the antenna, while maintaining high isolation between the transmit and receive paths. Two circuitry options include circulators and/or duplexers.

Some embodiments of the present disclosure provide for receiving and transmitting simultaneously over more than two frequency bands. Just like the case for two frequency bands, it is desirable to have low insertion loss from and to the antenna for each frequency band while maintaining high isolation between frequency bands.

Some embodiments of the present disclosure provide a multiplexer for three or more frequency bands that are used concurrently. Some embodiments provide that QHCs and filters are used to separate multiple frequencies. An advantage of some embodiments is that some embodiments are modular and scalable in the number of frequency bands. Accordingly, more frequency bands can be supported without significant degradation in performance. Another advantage of some embodiments is that some embodiments enable low-cost, compact multiplexers for commercial wireless communication systems in support of carrier aggregation, multi-standard, multi-band, and multi-mode operation. Another advantage of some embodiments is that some embodiments enable low-cost compact tunable frequency multiplexers that meet the requirements of commercial wireless communication standards. Yet another advantage of some embodiments is that some embodiments relax the requirements for filters and associated components in a multiplexer.

FIG. 1A illustrates an exemplary duplexer 110 using two similar band-pass filters 105 and 106, and two QHCs 104 and 107. The signal at the common port 101 may contain information in frequency bands $f_1$ and $f_2$. The duplexer 110 separates this signal to two signals: a signal at port 102 that primarily includes the information at the $f_2$ frequency band, and a signal at port at 109 that primarily includes the information at the $f_1$ frequency band. Ports 102 and 109 may be designated to receiver and/or transmit ports. Filters 105 and 106 pass signals in frequency band $f_1$, but not in frequency band $f_2$. In fact, filters 105 and 106 reflect the signal in frequency band $f_2$ at their inputs. A load 108, usually but not always equal to the impedance of the other ports such as 50 Ohms, for example, is coupled to the QHC 107 for correct termination of an unused port of the QHC 107. When designed properly, ports 102 and 109 are sufficiently isolated from each other, and the insertion loss at frequency band $f_2$ between ports 101 and 102 and the insertion loss at frequency band $f_1$ between ports 101 and 109 is sufficiently low.

Figure 1B:
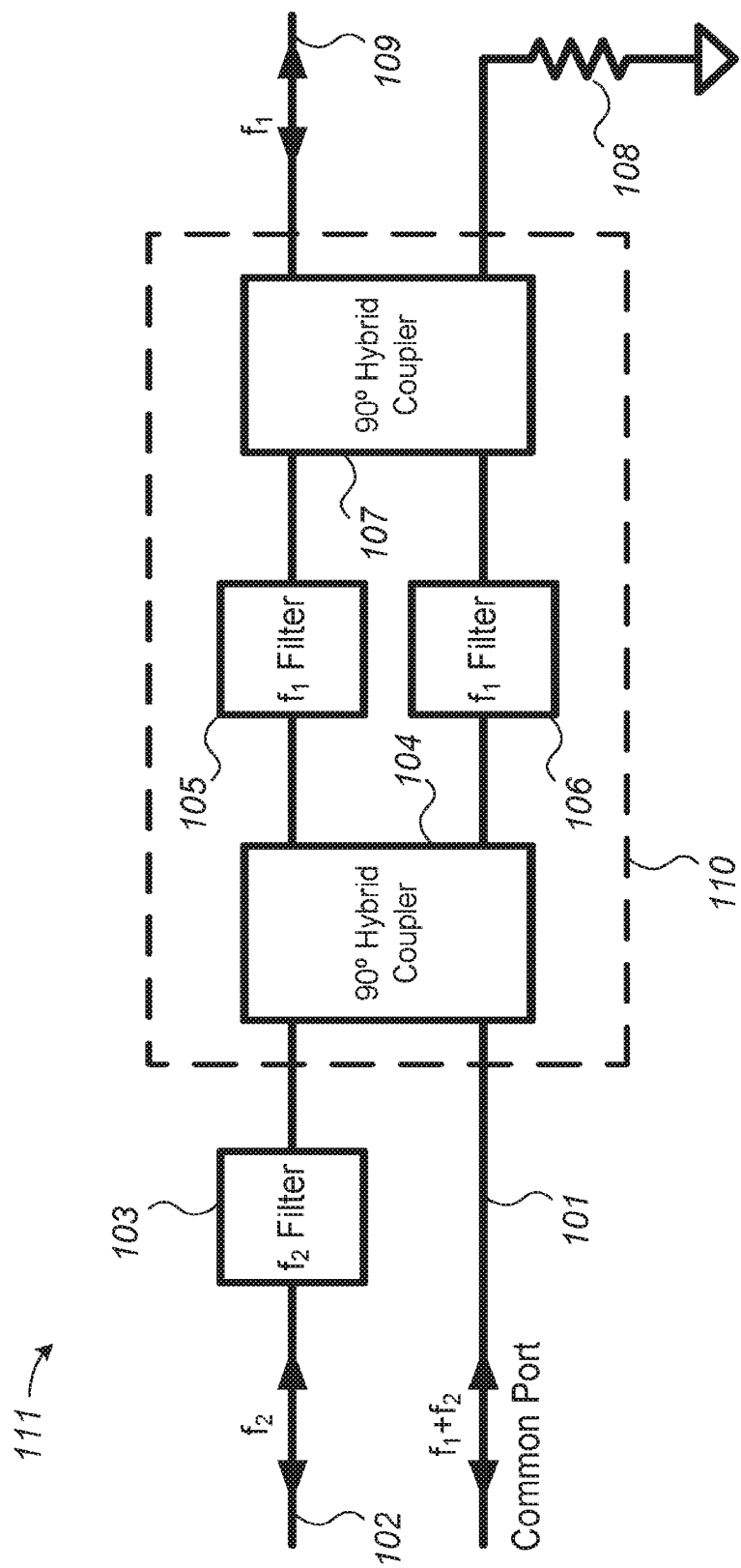
FIG. 1B illustrates an embodiment of a duplexer according to the present disclosure that supports two frequency bands, where band 1 is centered at frequency $f_1$, and band 2 is centered at frequency $f_2$.

FIG. 1B illustrates an exemplary duplexer 111 using three band-pass filters 103, 105, and 106 and two QHCs 104 and 107. The operation of FIG. 1B is similar to that of FIG. 1A—the additional filter 103 for frequency band $f_2$ improves the isolation between ports 102 and 109.

Figure 2:
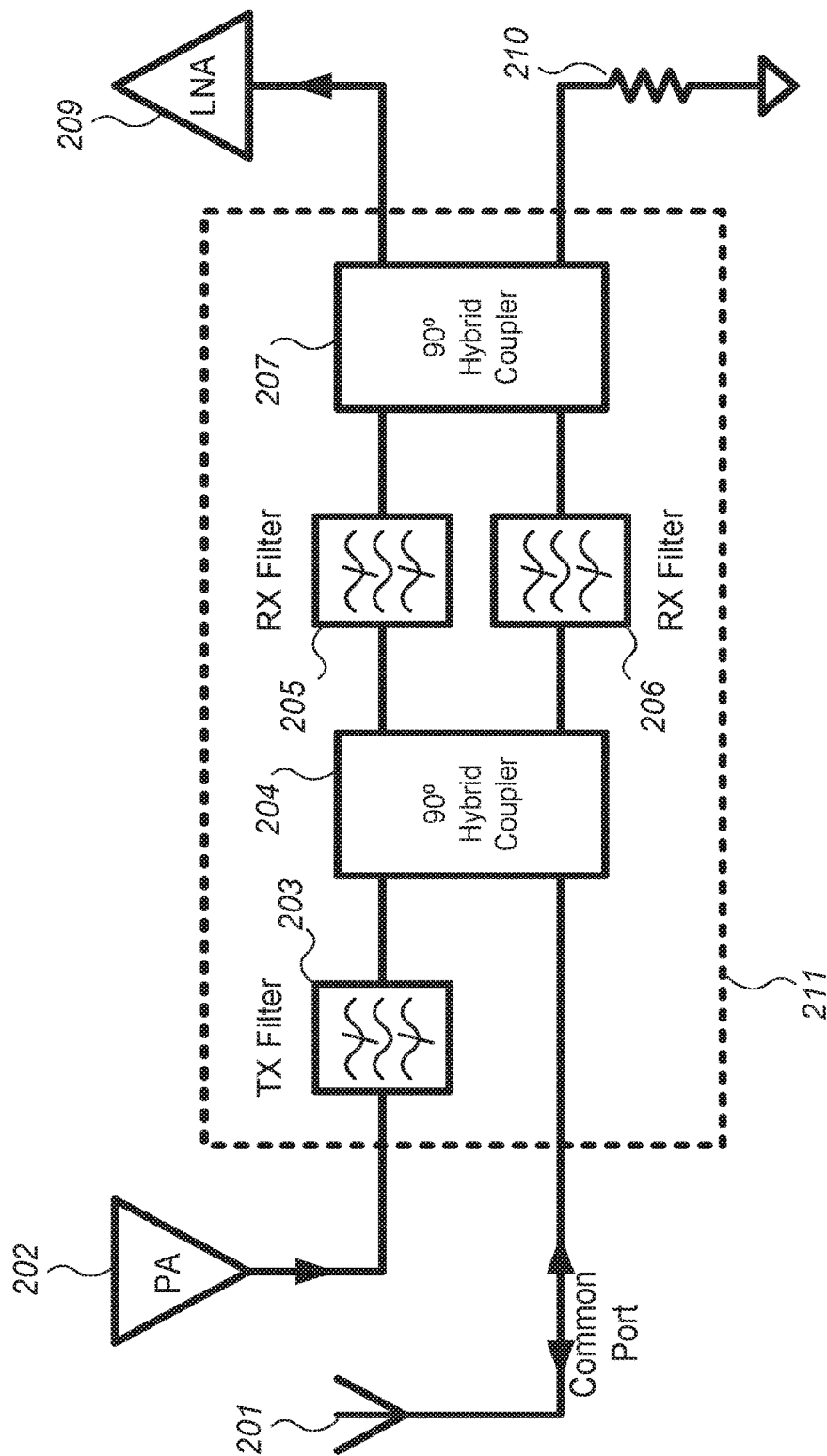
FIG. 2 illustrates an embodiment of a duplexer according to the present disclosure used in a front-end of a frequency division duplexed wireless communication system.

FIG. 2 illustrates an exemplary application of the circuitry in FIG. 1B in the front-end of a wireless communication system that supports FDD. The antenna 201 receives and transmits signals. Sub-circuit 211 is a duplexer. The duplexer 211 allows transmit signal (TX) to go from a power amplifier (PA) 202 at a transmitter output to an antenna 201 with little insertion loss, and receive signal (RX) to go from the antenna 201 to a low noise amplifier (LNA) 209 at a receiver input with little insertion loss, while keeping the receiver LNA 209 well isolated from the transmitter PA 202. The component at the interface of the receiver with the duplexer 2011 may be different from an LNA. Likewise, the component at the interface of the transmitter with the duplexer 211 may be different from a PA. The transmit signal that originates at the PA 202 goes through the TX filter 203 where most of the non-TX band frequencies are filtered out. The TX signal then goes through a QHC 204 where the TX signal is split into two signals that are 90° different in phase. The TX frequency band portion of the signals bounces back at the RX filters 205 and 206 because of the large impedance mismatch at the input ports of the RX filters 205 and 206 at the TX frequency band. The RX frequency band portion of the TX signal goes through the RX filters 205 and 206 and then through a QHC 207 where it constructively combines and is absorbed in a load 210. The TX frequency band portion of the TX signal that is reflected off the RX filters 205, 206 goes back through the QHC 204 and constructively combines at the antenna port of the QHC 204. The incoming receive signal is received by the antenna 201 and enters the QHC 204. The RX signal is split into two signals with a 90° phase difference between them. Both split signals go through the corresponding RX filters 205, 206 and then enter the second QHC 207 where the signals are constructively combined at the upper right port of QHC 207 and then enter the LNA 209. The isolation from the PA 202 to the LNA 209 is high since most of the TX signal goes to the antenna 201 and the portion that does not, for example, transmit noise in the RX frequencies, is mostly absorbed at the load 210. A disadvantage of the circuitry in FIG. 2 is that it separates only two bands. As such, by itself, it cannot be used in communication systems supporting carrier aggregation.

Figure 3:
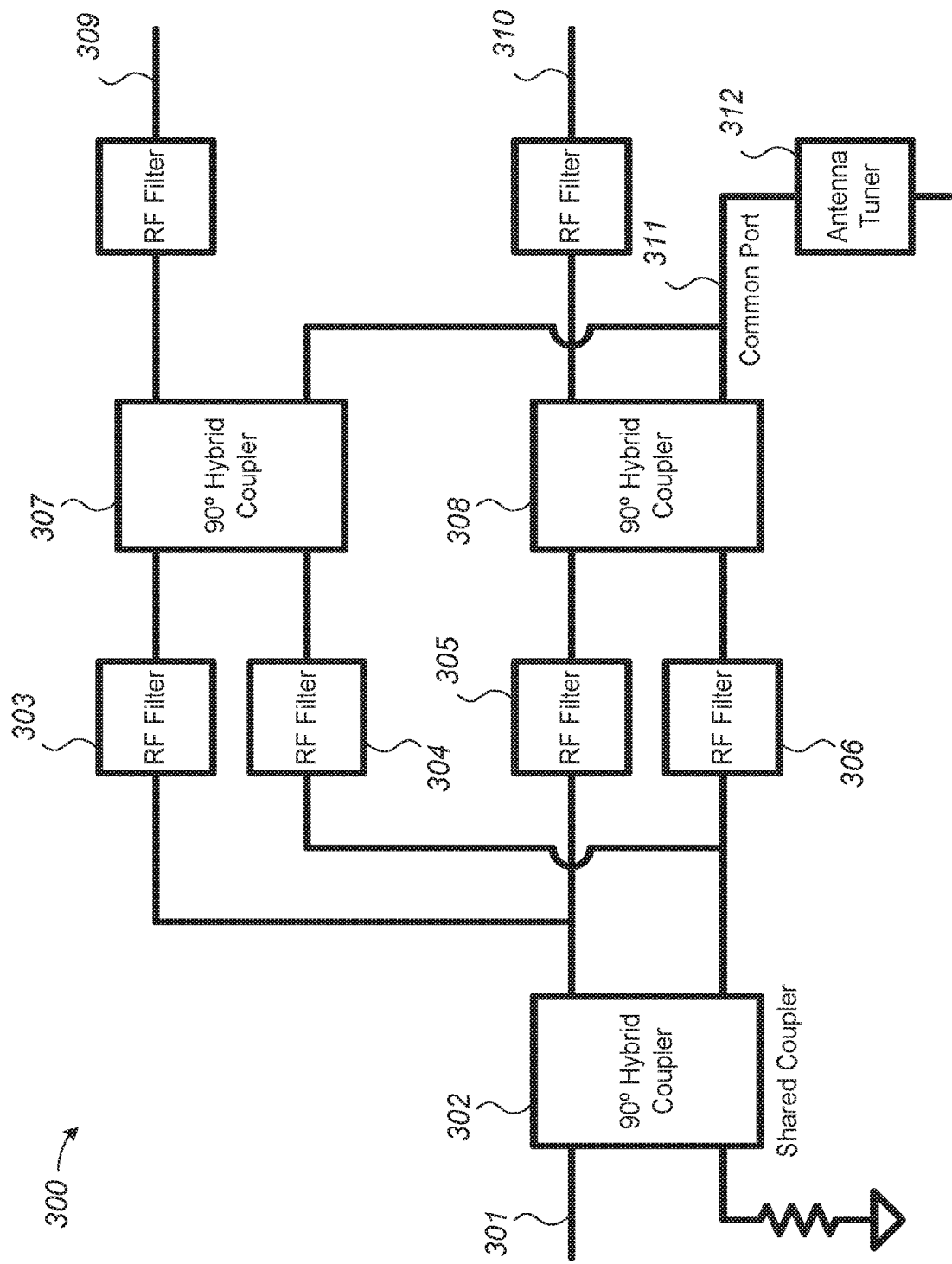
FIG. 3 illustrates an embodiment of a multiplexer according to the present disclosure that supports three frequency bands.

FIG. 3 illustrates exemplary circuitry that extends the hybrid-based duplexer scheme of FIG. 1A to a multiplexer 300 supporting more frequency bands, such as three frequency bands. The multiplexer 300 is based, in part, on the duplexer architecture disclosed in U.S. Pat. No. 9,048,805. There are several issues in this scheme. One issue arises from the interface between common port 311 and the two QHCs 307, 308. Since the common port 311 is connected to one 50-Ohm node of the QHC 307 and one 50-Ohm node of the QHC 308, it is a challenge, if not impossible, to connect the common port 311 to a third node and to an antenna tuner 312 and still maintain an impedance match. This impedance mismatch will cause degradation in the signal. Another issue with this scheme is that the signal that is meant to go from the common port 311 to a port 309 will be split into two signals at the common port 311 and each of the two signals, which are now half the power of the original signal, goes through QHCs 307 and 308. Only the signal that goes through QHC 307 ends up in the desired node 309 (through reflections from RF filters 303 and 304) while the other half of the signal that goes through QHC 308 does not make it to port 309. This means there is an inherent 3 dB loss for any signal going from the common port 311 to the output port 309. For a similar reason, there is also a 3 dB loss for any signal going from the common port 311 to an output port 310. The above-described issues are further exacerbated if the scheme were to be extended to support even more frequency bands.

Figure 4A:
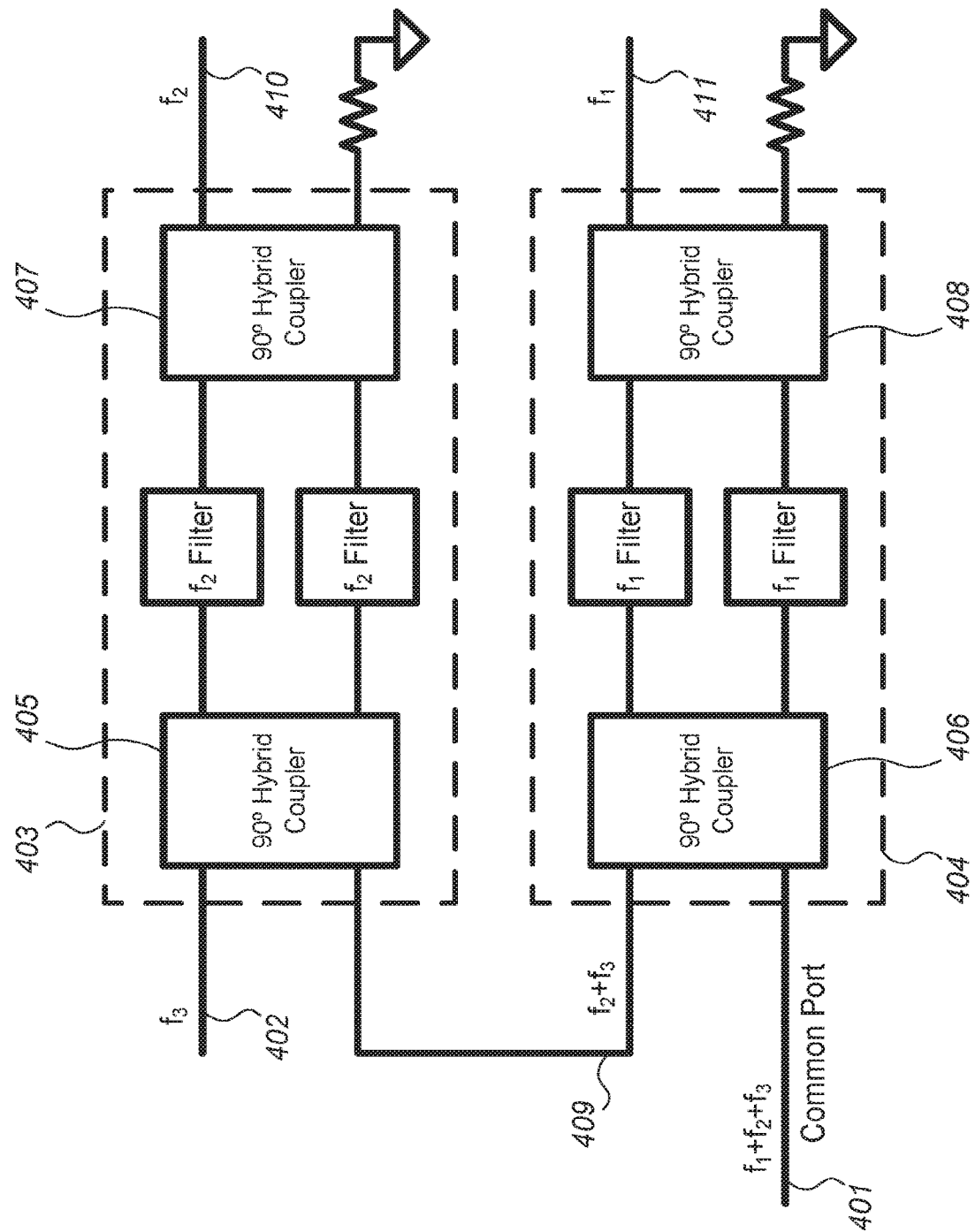
FIG. 4A illustrates an embodiment of a multiplexer according to the present disclosure that supports three frequency bands.

FIG. 4A illustrates an exemplary application of the duplexer 110 of FIG. 1A to accommodate three frequency bands $f_1$, $f_2$, and $f_3$. In this scheme, duplexers 403 and 404, each based on the FIG. 1A scheme, are connected in cascade. The duplexer 404 separates frequency band $f_1$ at port 411 and sends frequency bands $f_2$ and $f_3$ to the duplexer 403. The duplexer 403 separates frequency band $f_2$ at port 410 and frequency band $f_3$ at port 402. One issue with this scheme is that frequency bands $f_2$ and $f_3$ travel through two duplexers and associated components prior to their separation at ports 410 and 402. As such, signals at these frequency bands might incur more insertion loss and distortion. This might not be acceptable in many communication systems and standards.

Figure 4B:
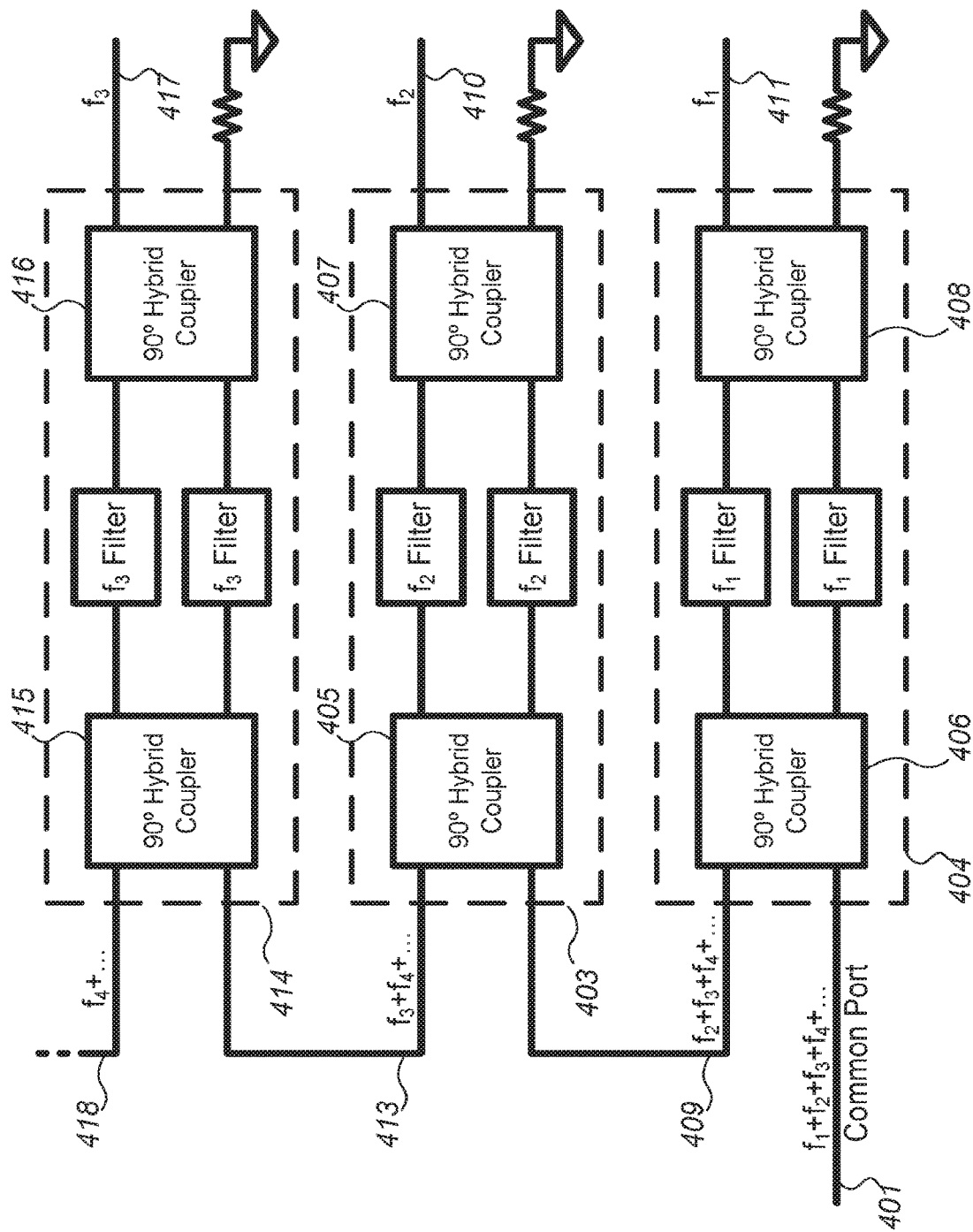
FIG. 4B illustrates an embodiment of a multiplexer according to the present disclosure that supports four or more frequency bands.

FIG. 4B illustrates an exemplary application of the duplexer 110 of FIG. 1A to accommodate four or more frequency bands $f_1$, $f_2$, $f_3$, $f_4$, . . . . In this scheme, duplexers 404, 403, 414, . . . , each based on the FIG. 1A scheme, are connected in cascade. The duplexer 404 separates frequency band $f_1$ at port 411 and sends frequency bands $f_2$, $f_3$, $f_4$, . . . to the duplexer 403. The duplexer 403 separates frequency band $f_2$ at port 410 and sends frequency bands $f_3$, $f_4$, . . . to the duplexer 414. The duplexer 414 separates frequency band $f_3$ at port 417 and sends frequency bands $f_4$, . . . to another duplexer (not shown). In total, N-1 cascaded duplexers are used to separate N frequency bands. One issue with this scheme is that frequency bands must travel through several duplexers and associated components prior to their separation. As such, signals at these frequency bands might incur more insertion loss and distortion. For instance, frequency band $f_4$ travels through at least duplexers 404, 403, 414 before getting properly separated out. This might not be acceptable in many communication systems and standards.

Figure 5A:
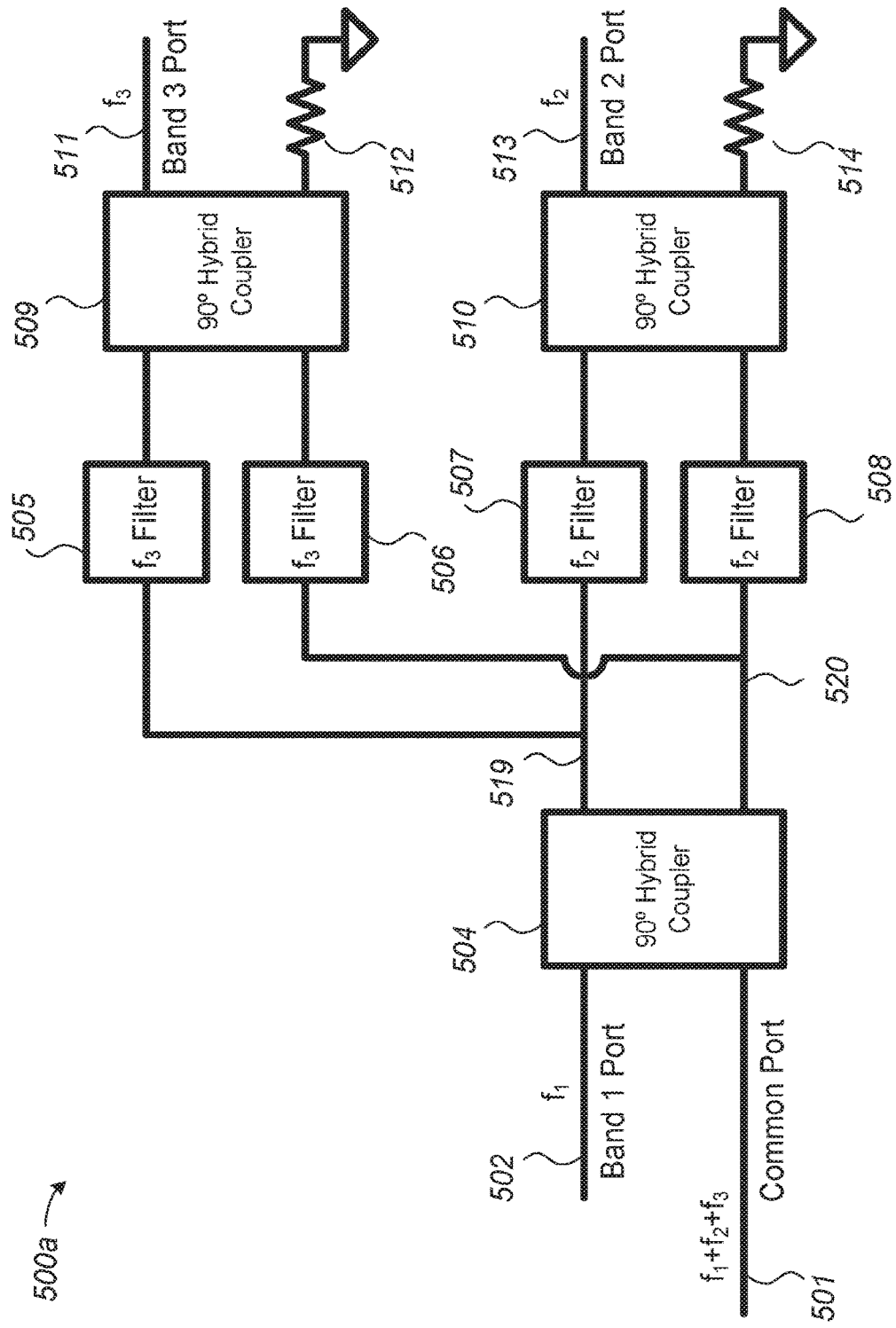
FIG. 5A illustrates an embodiment of a multiplexer according to the present disclosure that supports three frequency bands.

FIG. 5A illustrates an embodiment of a multiplexer according to the present disclosure. Referring to FIG. 5A, a multiplexer 500a is configured to cover three frequency bands, and as such is also known as a triplexer. Coupling of a first pair of filters 507, 508 (that are substantially similar) and a first QHC 504 and a second QHC 510, by itself, discriminates frequency bands $f_1$ and $f_2$. Coupling of a second pair of filters 505, 506 (that are substantially similar) and the first QHC 504 and a third QHC 509, by itself, discriminates frequency bands $f_1$ and $f_3$. Together, judicious coupling of QHCs 504, 509, 510 and filters 505, 506, 507, 508 enables discrimination of all frequency bands $f_1$, $f_2$, and $f_3$ of interest. The signal at the common port 501, carrying signals at frequency bands $f_1$, $f_2$, and $f_3$, is coupled to two nodes each having two filters, namely, the filters 505 and 507, and the filters 506 and 508, respectively, through the QHC 504. The filters 505, 506, 507, and 508 are designed to absorb all the signal power at their designated passbands while reflecting all the signal power at stopbands. For instance, the filters 505 and 506 absorb signals at frequency band $f_3$, and reflect signals at frequency bands $f_1$ and $f_2$. Likewise, filters 507 and 508 absorb signals at frequency band $f_2$, and reflect signals at frequency bands $f_1$ and $f_3$. Therefore, collectively, filters 505 and 507, and filters 506 and 508, reflect the signals at frequency band $f_1$ back to QHC 504 and port 502.

In some embodiments, the impedance looking into a common node 519 of filters 505 and 507 is primarily determined by the filter 505 at frequency band $f_3$ and by the filter 507 at frequency band $f_2$. The same holds for the impedance looking into a common node 520 of filters 506 and 508. In practice, filters 505 and 507 are co-designed to ensure proper impedance level at their common node 519 while providing the desired frequency response. Filters 506 and 508 are co-designed to ensure proper impedance level at their common node 520 while providing the desired frequency response. In some embodiments, additional passive circuitry may be added at the common node of the filters to improve the impedance matching. One advantage of this scheme according to some embodiments is that information in each desired frequency band only travels through one pair of QHCs and appropriate filters, thereby eliminating. the above-described extra insertion loss and distortion of other realizations. Filters 505; 506, 507, 508 collectively reflect the portions of the common port signal that reside at frequency band $f_1$ back to the QHC 504 towards the first port 502. Each of the first port 502, the second port 513, and the third port 511 may be an input port, an output port, or an input/output port. In other words, each of the ports 502, 511, and 513 may correspond to a transmitter port, a receiver port, or a transceiver port. The common port 501 may accommodate all three frequency bands $f_1$, $f_2$, and $f_3$. In a wireless communication system, this common port 501 may correspond to an antenna port. In some embodiments, one or more of the filters 505, 506, 507, 508 may have one or more passbands, and/or may specifically include one or more stopbands (notches) to eliminate undesired frequency bands.

Figure 5B:
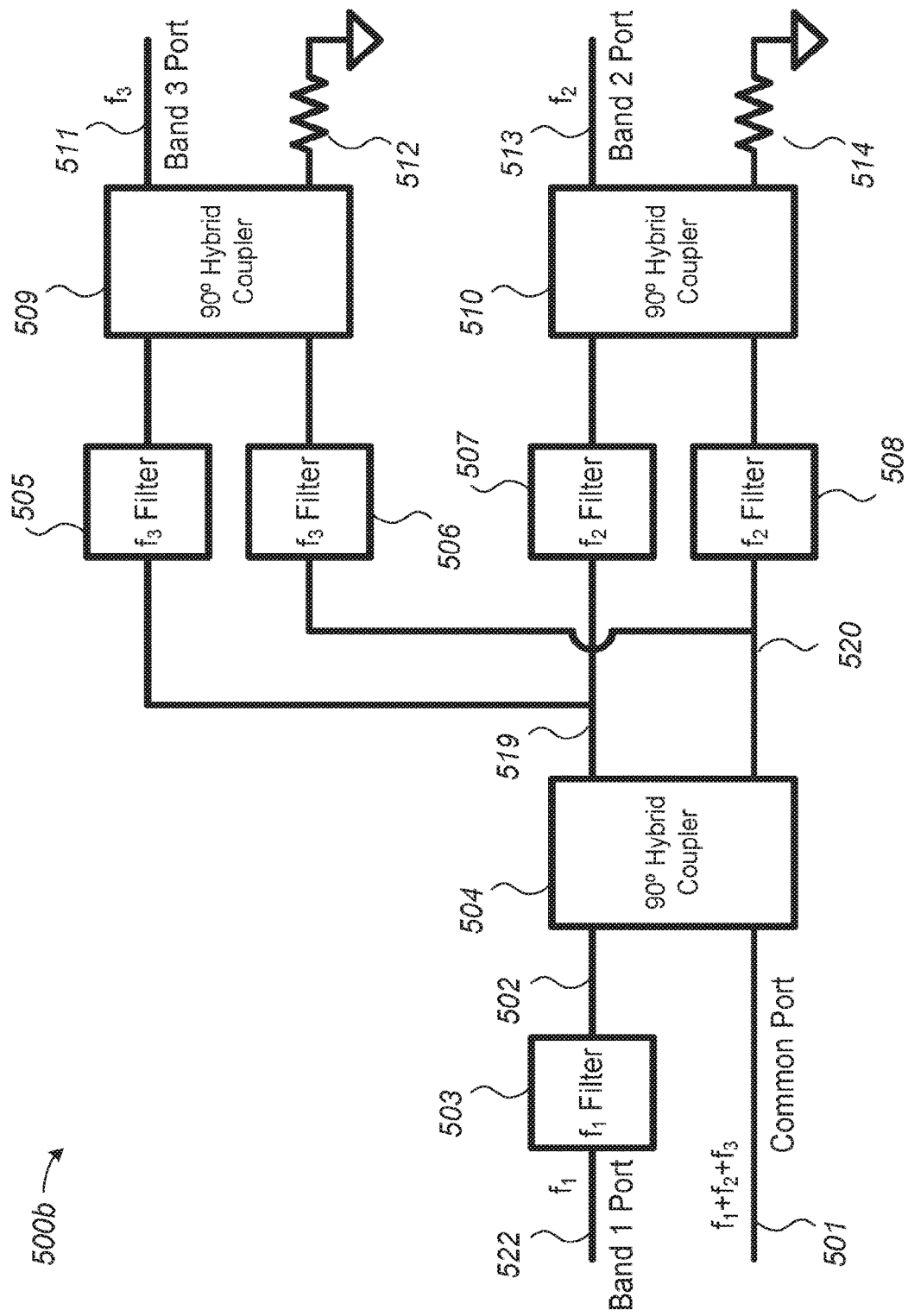
FIG. 5B illustrates an embodiment of a multiplexer according to the present disclosure that supports three frequency bands.

FIG. 5B illustrates another embodiment of a multiplexer according to the present disclosure where an additional filter 503 with a passband at frequency band $f_1$ is added between port 502 of the scheme in FIG. 5A and Band 1 Port 522. While the band discrimination operation of FIG. 5B is similar to that of FIG. 5A, the additional filter 503 filter improves the isolation between ports 522 and 511, and the isolation between ports 522 and 513. In some embodiments, filter 503 may have one or more passbands, and may specifically include one or more stopbands (notches) to eliminate undesired frequency bands.

Figure 5C:
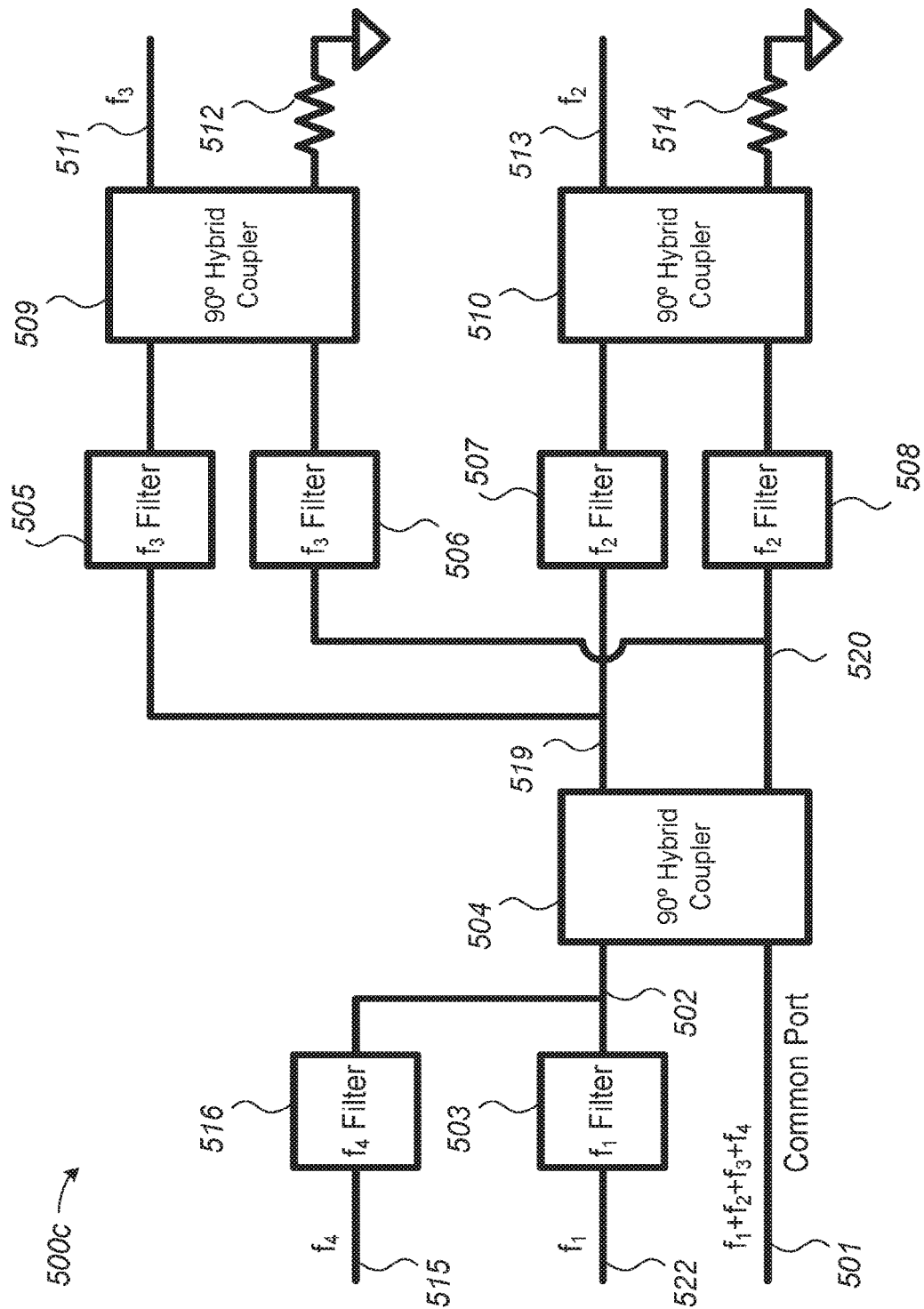
FIG. 5C illustrates an embodiment of a multiplexer according to the present disclosure that supports four frequency bands.

FIG. 5C illustrates another embodiment of a multiplexer according to the present disclosure. Referring to FIG. 5C, a multiplexer 500c is configured to cover four frequency bands, and as such is also known as a quadplexer. Filter 516, with a passband frequency band $f_4$, is added to the port 502 of the QHC 504. Filters 503 and 516 are designed to absorb all the signal power at their designated passbands while reflecting all the signal power at stopbands. For instance, the filter 503 absorbs signals at frequency band $f_1$ and reflects signals at frequency band $f_4$. Likewise, the filter 516 absorbs signals at frequency band $f_4$, and reflects signals at frequency band $f_1$. In some embodiments, the impedance looking into the common node 502 of the filters 503 and 516 is primarily determined by the filter 503 at frequency band $f_1$ and by the filter 516 at frequency band $f_4$. In practice, filters 503 and 516 are co-designed to ensure proper impedance level at their common node 502 while providing the desired frequency response. In some embodiments, additional passive circuitry may be added at the common node 502 of these filters 503, 516 to improve the impedance matching.

Figure 5D:
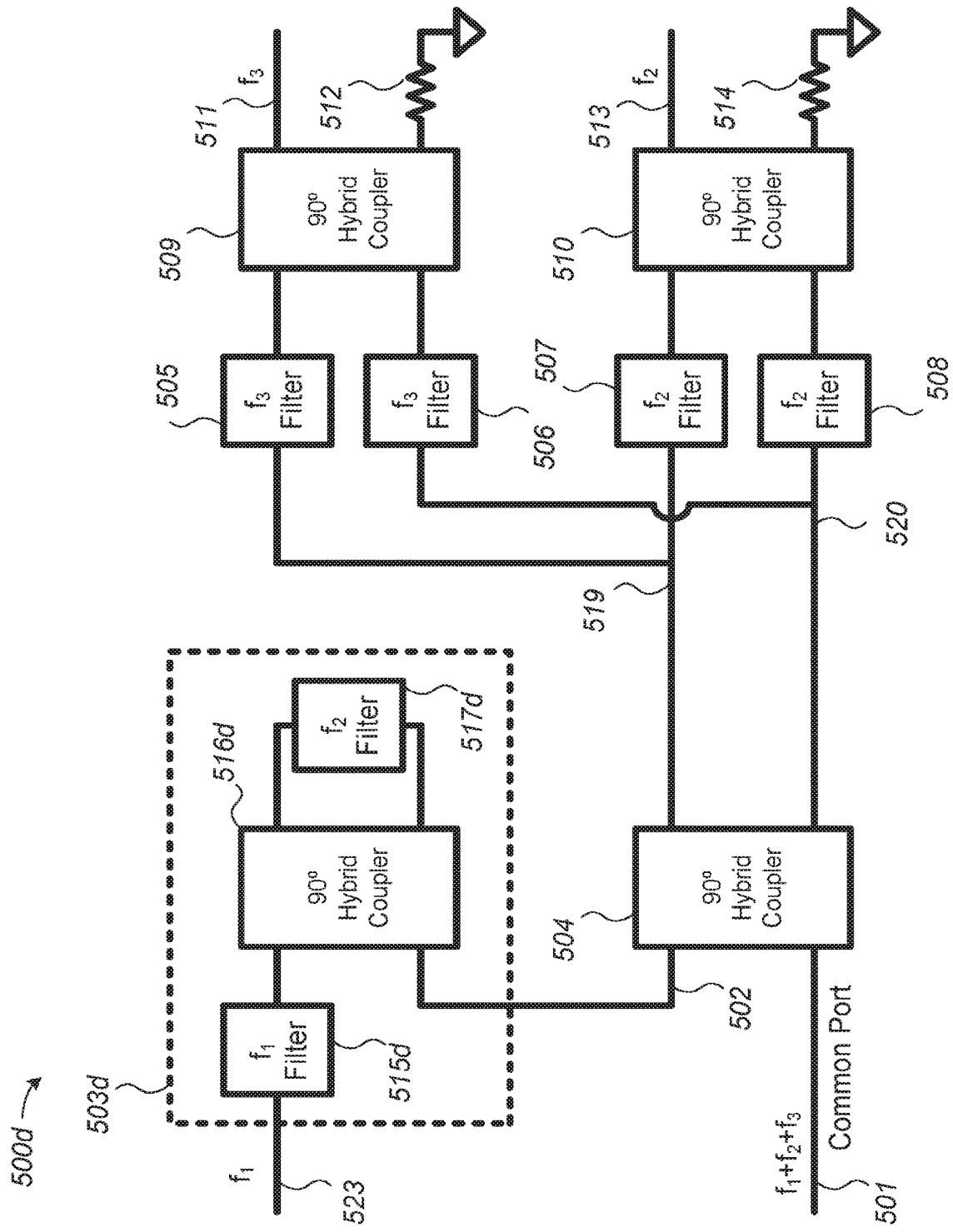
FIG. 5D illustrates an embodiment of a multiplexer according to the present disclosure that supports three frequency bands.

FIG. 5D illustrates another embodiment of a multiplexer according to the present disclosure. Referring to FIG. 5D, a multiplexer 500d (specifically, a triplexer) includes, for example, circuitry block 503d. Circuitry block 503d is tuned to pass frequency band $f_1$ and stop frequency band $f_2$ (e.g., via a bandstop at frequency band $f_2$), and is added between the port 502 of the scheme in FIG. 5A and a Band 1 Port 523. The circuitry block 503d serves at least two purposes: it provides band-pass filtering at frequency band $f_1$ between ports 502 and 523, and it provides a stopband filtering at frequency band $f_2$ between the ports 502 and 523. As a result, the isolation between the port 523 for frequency band $f_1$ and the port 513 for frequency band $f_2$ is improved. In some embodiments, $f_2$ filter 517d in the block 503d may be the same or similar filter as the other $f_2$ filters 507 and 508, or it may be a different filter that has a passband at frequency band $f_2$. The filter 517d does not strictly have to be a passband filter. For example, as long as the filter 517d includes circuitry that passes frequency band $f_2$ and blocks frequency band $f_1$, the circuitry may be used. In some embodiments, one or more of the filters 505, 506, 507, 508, and 515d may have one or more passbands, and may specifically include one or more stopbands (notches) to eliminate undesired frequency bands.

Figure 5E:
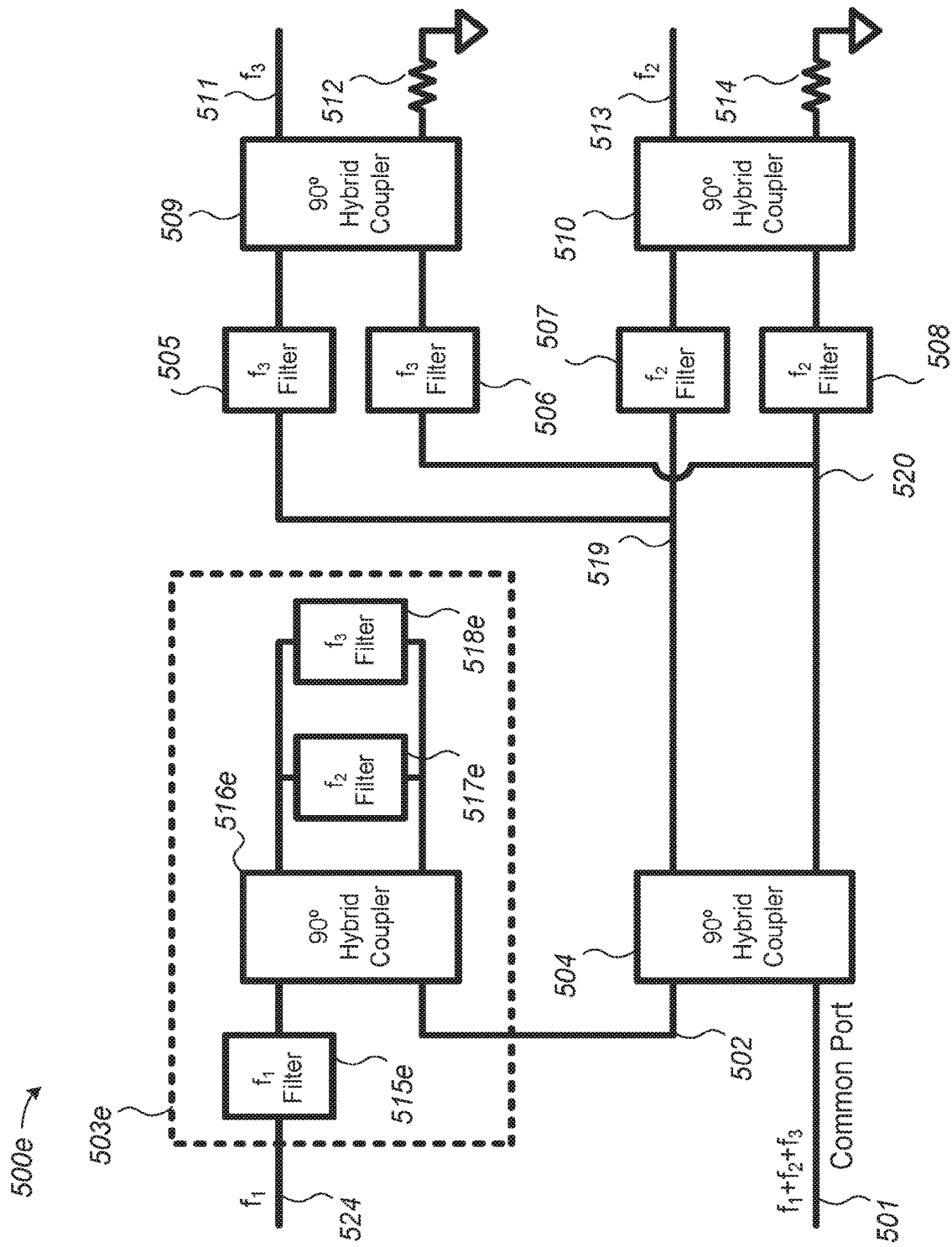
FIG. 5E illustrates an embodiment of a multiplexer according to the present disclosure that supports three frequency bands.

FIG. 5E illustrates another embodiment of a multiplexer according to the present disclosure. Referring to FIG. 5E, a multiplexer 500e (specifically a triplexer) includes, for example, circuitry block 503e tuned to pass frequency band $f_1$, and stop frequency bands $f_2$ and $f_3$ (e.g., via a bandstop at frequency bands $f_2$ and $f_3$), and is added between port 502 of the scheme in FIG. 5A and a Band 1 Port 524. The circuitry block 503e serves at least two purposes: it provides band-pass filtering at frequency band $f_1$ between the ports 502 and 524, and it provides stopband filtering at frequency bands $f_2$ and $f_3$ between the ports 502 and 524. In some embodiments, the circuitry block 503e includes $f_1$ filter (first filter) 515e, $f_2$ filter (second filter) 517e, $f_3$ filter (third filter) 518e, and QHC (fourth QHC) 516e. As a result, the isolation between the port 524 for frequency band $f_1$ and the port 513 for frequency band $f_2$ as well the isolation between the port 524 for frequency band $f_1$ and the port 511 for frequency band f3 is improved. In some embodiments, $f_2$ filter 517e in the block 503e may be the same or similar filter as the other $f_2$ filters 507 and 508, or it may be a different filter that has a passband at frequency band $f_2$. The filter 517e does not strictly have to be a passband filter. For example, as long as the filter 517e includes circuitry that passes frequency band $f_2$ and blocks frequency band $f_1$, the circuitry may be used. In some embodiments, $f_3$ filter 518e in the block 503e may be the same or a similar filter as the other $f_3$ filters 505 and 506, or it may be a different filter that has a passband at frequency band $f_3$. The filter 518e does not strictly have to be a passband filter. For example, as long as the filter 518e includes circuitry that passes frequency band $f_3$ and blocks frequency band $f_1$, the circuitry may be used. In some embodiments, one or more of the filters 505, 506, 507, 508, and 515e may have one or more passbands, and may specifically include one or more stopbands (notches) to eliminate undesired frequency bands.

Figure 6:
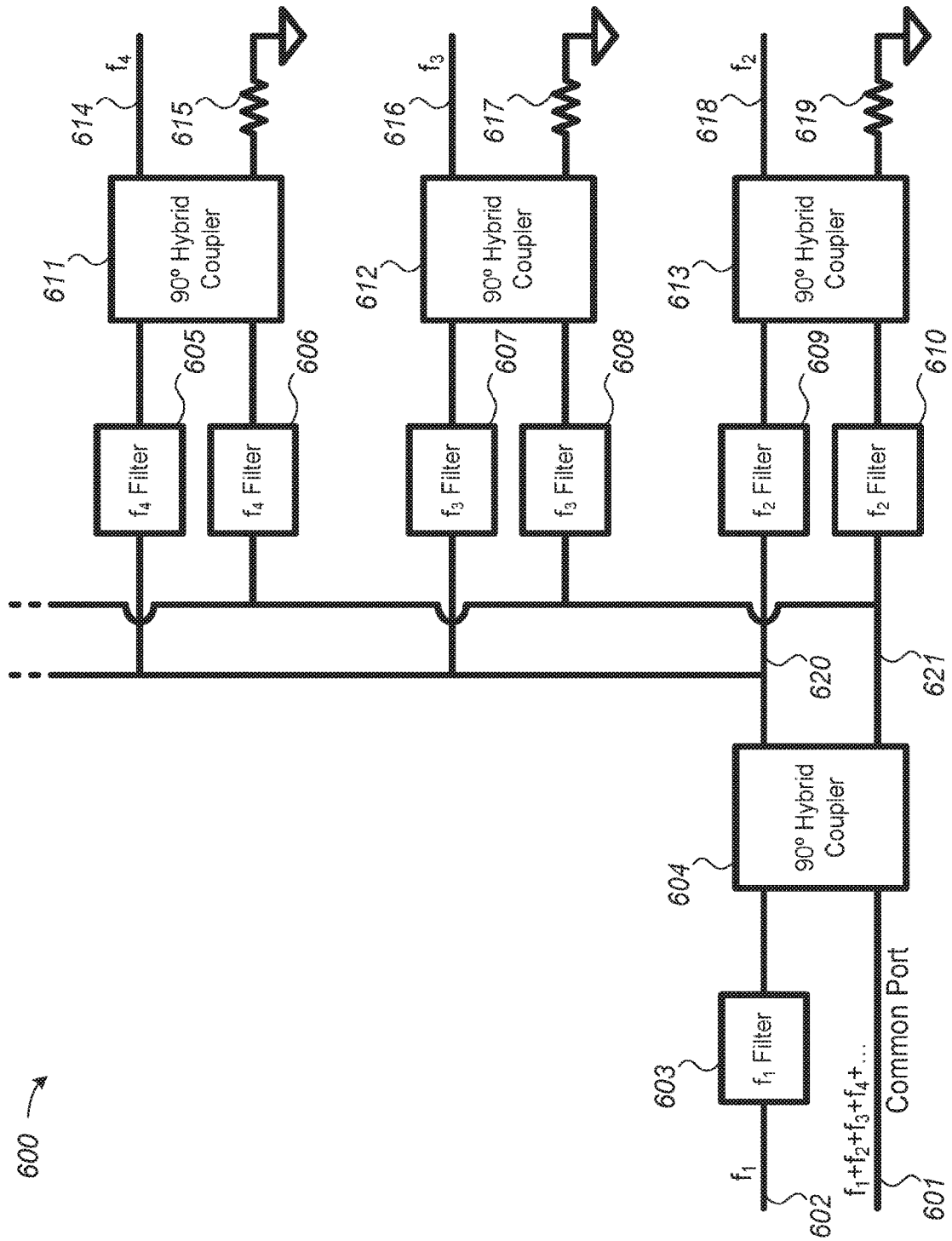
FIG. 6 illustrates an embodiment of a multiplexer in support of four or more frequency bands.

FIG. 6 illustrates one embodiment of a multiplexer according to the present disclosure. Referring to FIG. 6, a scalable multiplexer architecture 600 is configured to cover multiple frequency bands (e.g., four bands). For every new frequency band of interest, a pair of similar filters and a QHC can be added and connected to nodes 620 and 621. Every similar filter pair, such as filters 609, 610, filters 607, 608, or filters 605, 606, passes one of the frequency bands of interest, such as frequency bands $f_2$, $f_3$, or $f_4$, while not passing (reflecting) other frequency bands of interest. These filters need not be strictly band-pass filters with one passband. Filter 603 improves the isolation between port 602 and other ports, such as ports 618, 616, and 614, at frequency band $f_1$ and the frequency bands $f_2$, $f_3$, and $f_4$ designated at those ports. The filter 603 need not be only a band-pass at frequency band $f_1$, but may include one or more stopbands at other frequency bands to further enhance the isolation.

Figure 7A:
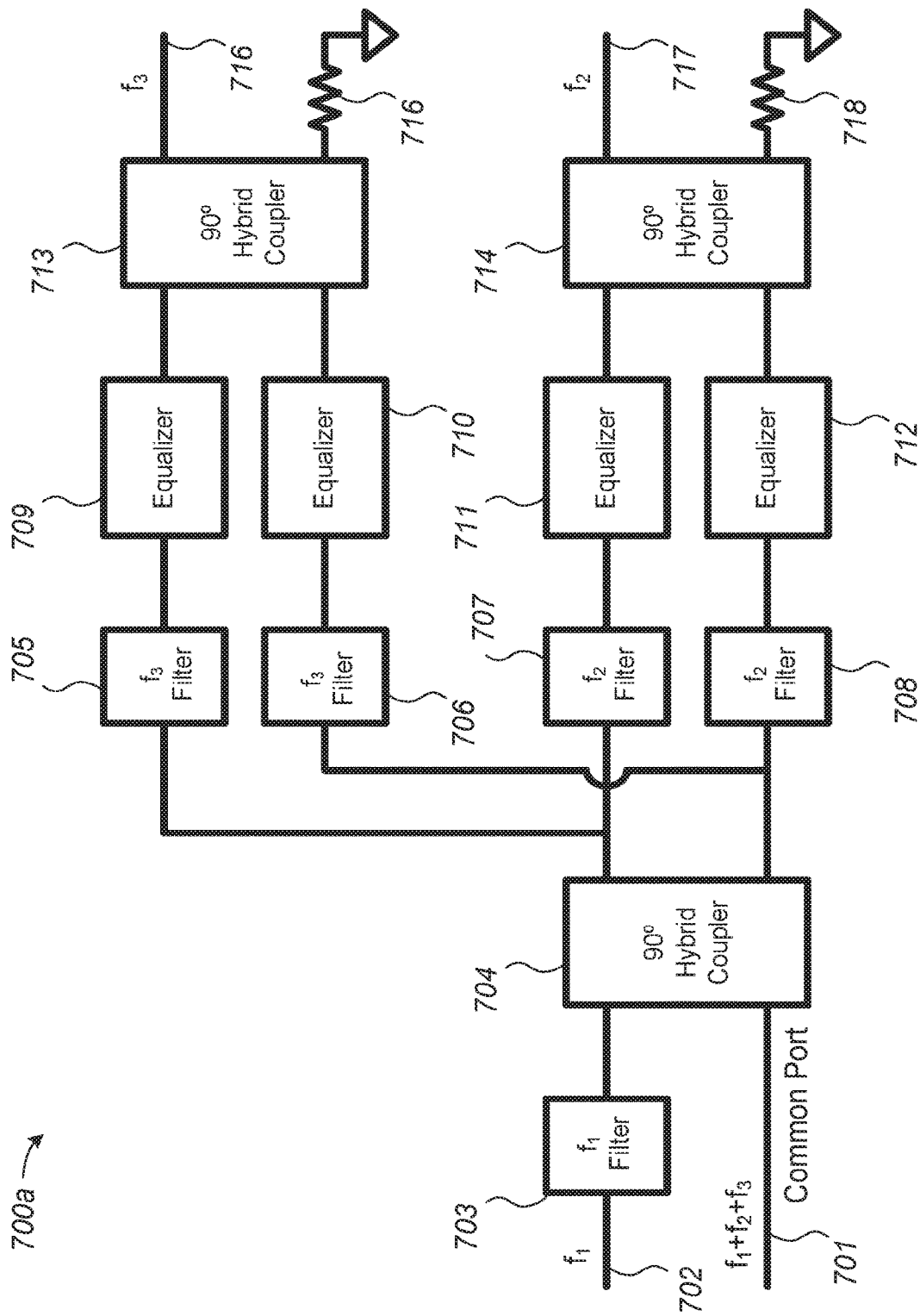
FIG. 7A illustrates an embodiment of a multiplexer according to the present disclosure that supports three frequency bands with equalizers.

FIG. 7A illustrates another embodiment of a multiplexer according to the present disclosure. Referring to FIG. 7A, multiplexer 700a includes, for example, two pairs of equalizers 709, 710 and 711, 712 that are added to the scheme of FIG. 5B. These equalizers 709, 710, 711, 712 may be used to compensate for the imperfections of the QHCs 704, 713, and 714 and filters 703, 705, 706, 707, and 708. Each of these equalizers 709, 710, 711, 712 may include, for example, a phase shifter and an attenuator. The phase shifter and the attenuator may be fixed or variable, depending on the application and design. One or more of the equalizers 709, 710, 711, 712 may include one or more time delay elements, and may include one or more phase shifters and/or attenuators. In some embodiments, the equalizers 709, 710, 711, 712 in the multiplexer 700a may be fully passive (to ensure high linearity), low noise, and low power consumption. In some embodiments, the equalizers 709, 710, 711, 712 in the multiplexer 700a may include transmission lines with appropriate length and characterization impedance to enhance the isolation or reduce the insertion loss in presence of QHCs imperfections.

Figure 7B:
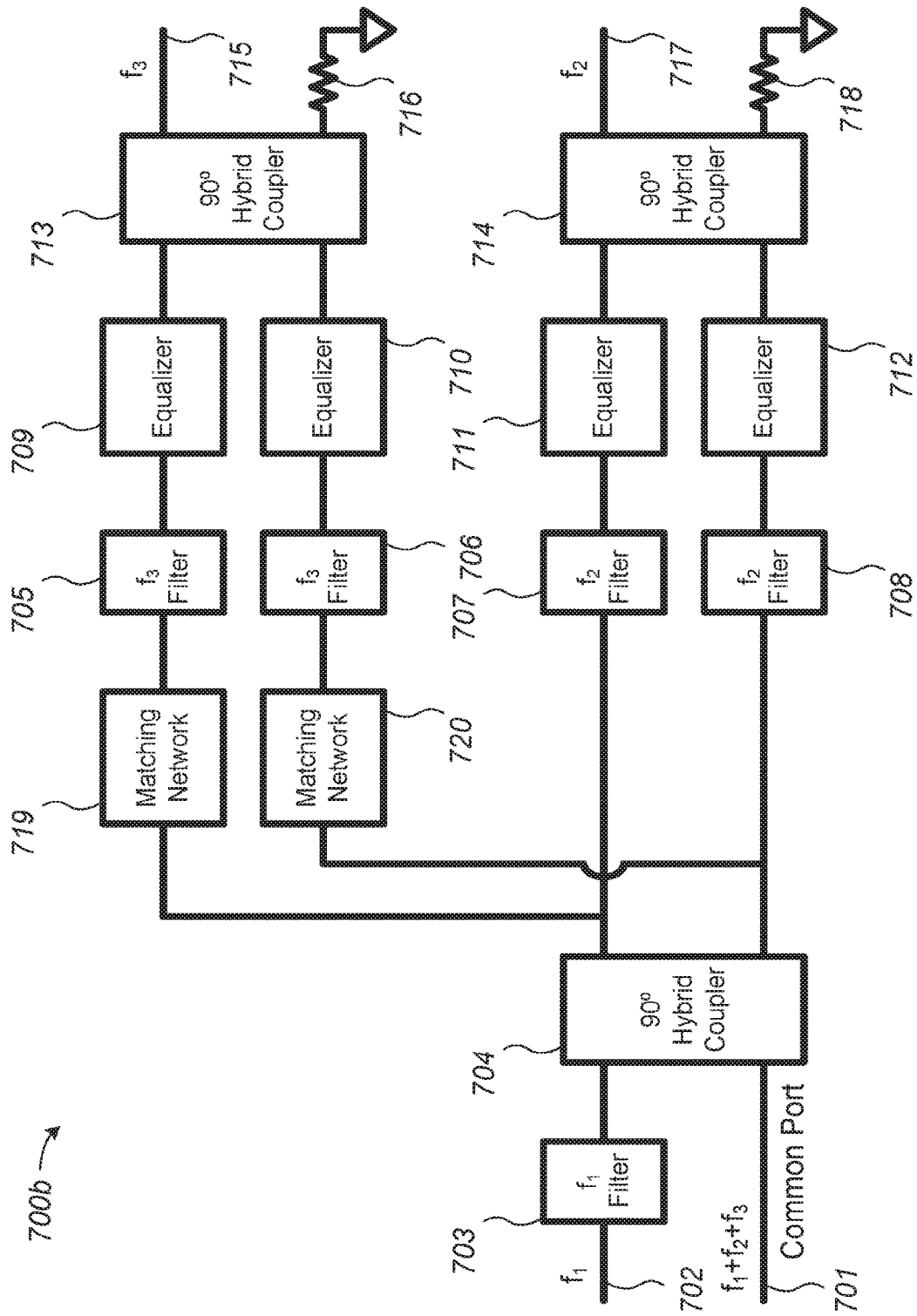
FIG. 7B illustrates an embodiment of a multiplexer according to the present disclosure that supports three frequency bands with equalizers and impedance matching networks.

FIG. 7B illustrates another embodiment a multiplexer according to the present disclosure. Referring to FIG. 7B, multiplexer 700b includes, for example, impedance matching networks 719 and 720 that are added to the scheme of FIG. 7A to compensate for unwanted impedance mismatches that may occur between $f_3$ filters 705, 706 and QHC 704. Although shown explicitly as separate circuitry blocks, some embodiments provide that impedance matching networks 719, 720 may be embedded in $f_3$ filters 705 and 706, respectively.

Figure 7C:
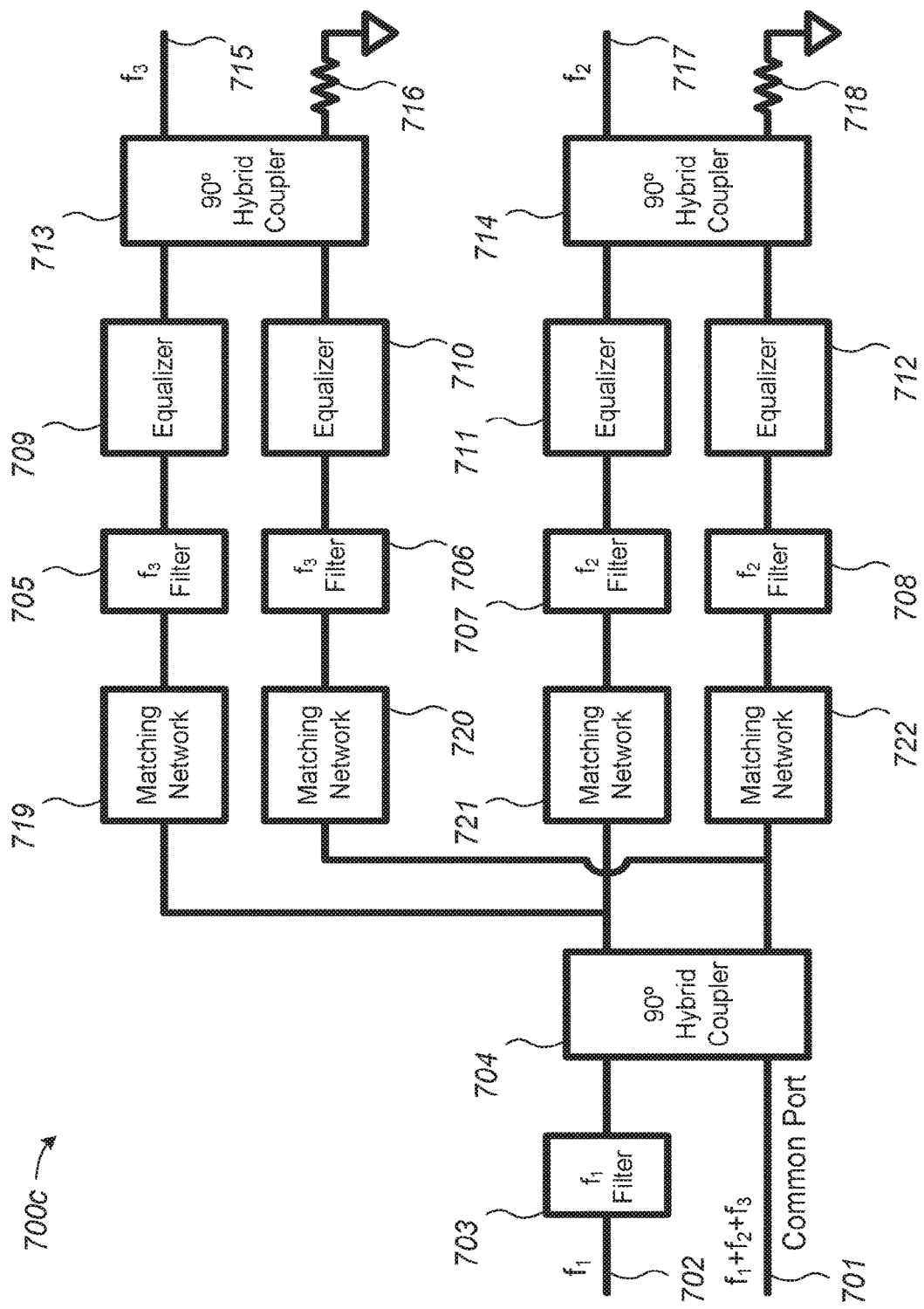
FIG. 7C illustrates an embodiment of a multiplexer according to the present disclosure that supports three frequency bands with equalizers and impedance matching networks.

FIG. 7C illustrates another embodiment of a multiplexer according to the present disclosure. Referring to FIG. 7C, multiplexer 700c includes, for example, impedance matching networks 721 and 722 that are added to the scheme of FIG. 7B to compensate for unwanted impedance mismatches that may occur between $f_2$ filters 707, 708 and QHC 704. Although shown explicitly as separate circuitry blocks, some embodiments provide that impedance matching networks 721, 722 may be embedded in $f_2$ filters 707 and 708, respectively.

Figure 7D:
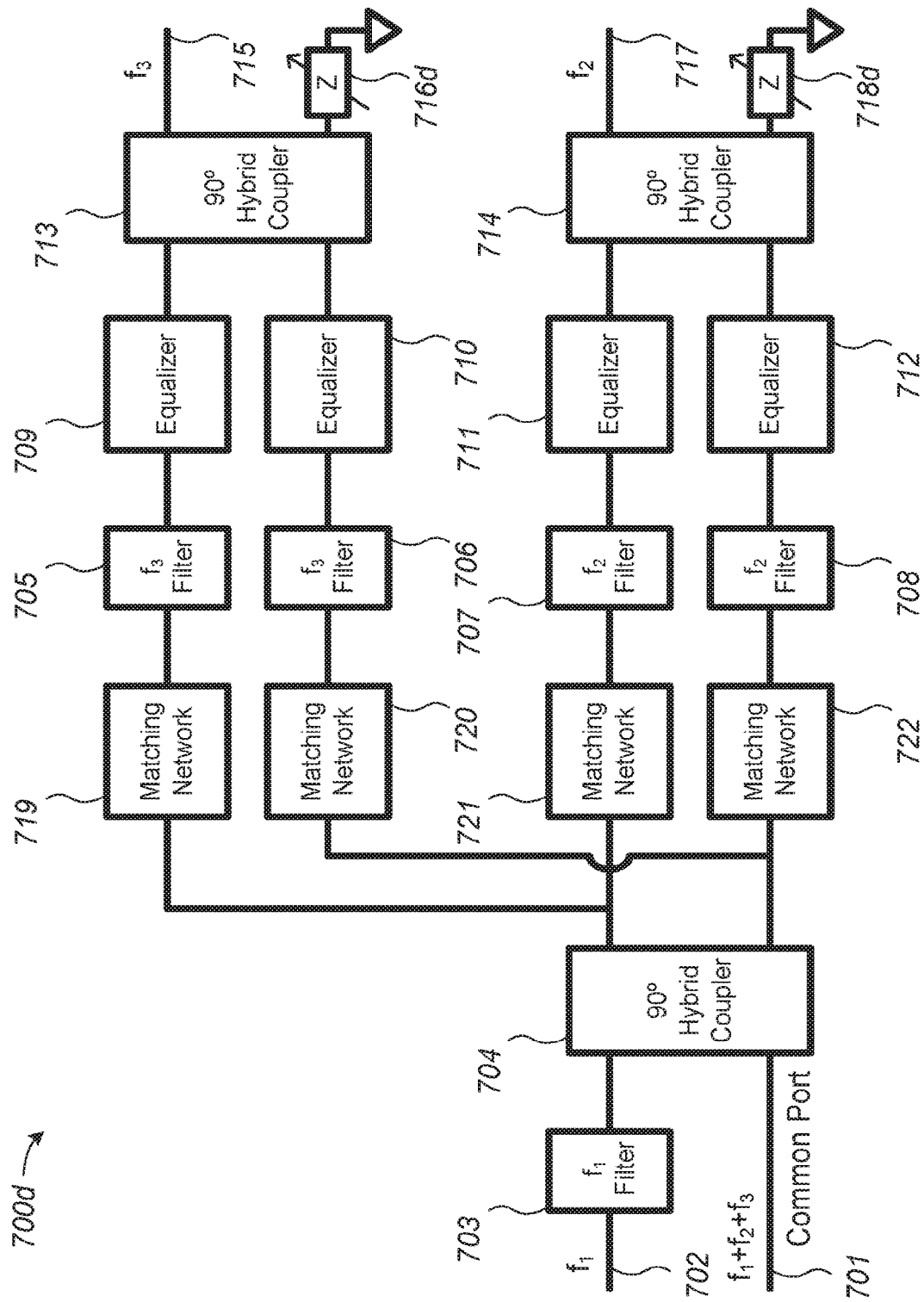
FIG. 7D illustrates another embodiment of a multiplexer according to the present disclosure that supports three frequency bands with equalizers and impedance matching networks.

FIG. 7D illustrates another embodiment of a multiplexer according to the present disclosure. Referring to FIG. 7D, multiplexer 700d provides, for example, that termination resistors 716 and 718 in FIG. 7C are replaced with tunable impedances 716d and 718d, respectively, to enhance the isolation between ports 717 ($f_2$) and 702 ($f_1$), and also between ports 715 ($f_3$) and 702 ($f_1$). In some embodiments, the values of the tunable impedances 716d and 718d may be set manually or automatically, and may depend on an antenna impedance. Tunable impedances 716d and 718d may include, for example, tunable capacitors, tunable inductors, tunable resistors, and/or tunable resonators.

Figure 8:
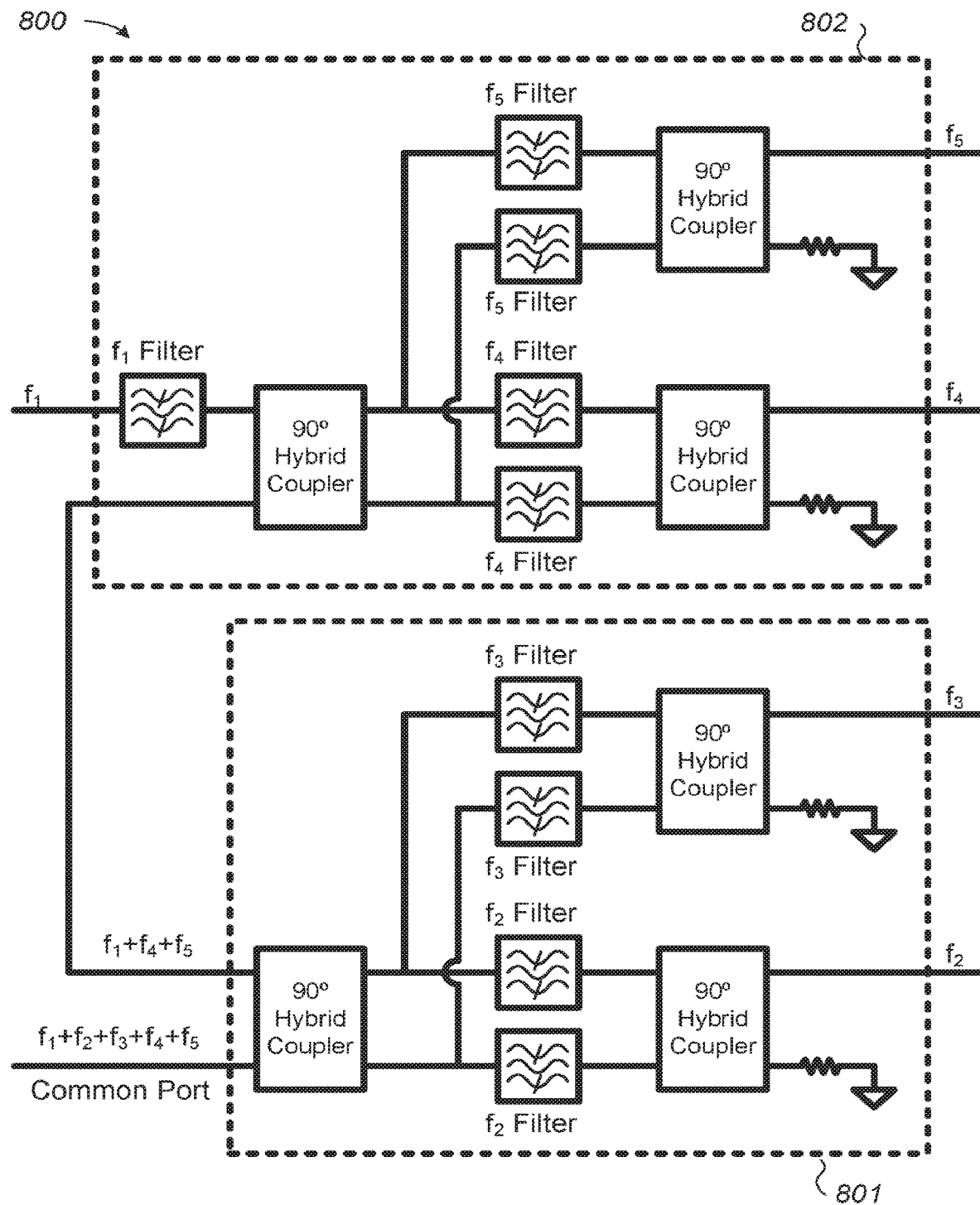
FIG. 8 illustrates an embodiment of a multiplexer according to the present disclosure that supports five frequency bands.

FIG. 8 illustrates another embodiment of a multiplexer according to the present disclosure. Referring to FIG. 8, multiplexer 800 is configured to accommodate five frequency bands, and is constructed from a cascade connection of triplexer 801 (based on the scheme of FIG. 5A) and triplexer 802 (based on the scheme of FIG. 5B). Other multiplexer configurations may also be constructed in a similar way by cascade connection of any number of multiplexers disclosed in the present disclosure.

Figure 9:
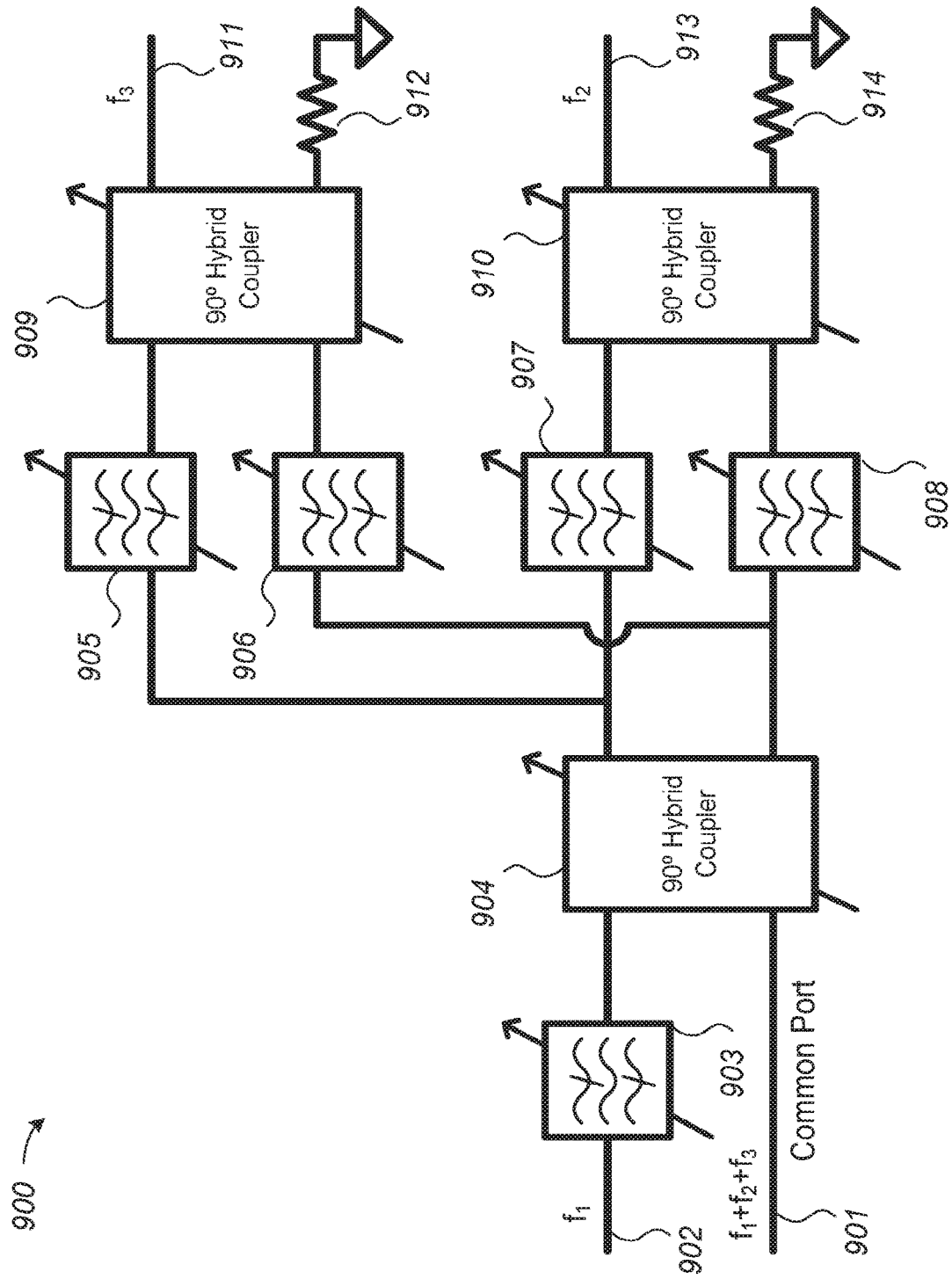
FIG. 9 illustrates tunable multiplexer according to the present disclosure that supports three frequency bands.

FIG. 9 illustrates another embodiment of a multiplexer according to the present disclosure. Referring to FIG. 9, a tunable multiplexer, such as a tunable triplexer 900, is configured to support three frequency bands that might not be fixed. To support frequency tunability, filters 903, 905, 906, 907, and 908 and QHCs 904, 909, and 910 may be tunable. Not all of these circuitry blocks must be tunable to realize a tunable multiplexer according to some embodiments of the present disclosure. In some embodiments, the QHCs 904, 909, and 910 may be wideband to support multiple frequency bands. Any number of mechanisms might be applied to enable tunability of the QHCs 904, 909, and 910. The tunable filters 903, 905, 906, 907, and 908 may include tunable components such as tunable capacitors, tunable inductors, tunable resonators, etc. The control signals for the tunable circuitry blocks or components may be initiated from a transceiver or a processing unit or an algorithm, or may be set manually. Some embodiments of the tunable multiplexer may be realized using tunable circuitry blocks or components in any of the multiplexer structures or configurations of the present disclosure.

Figure 10:
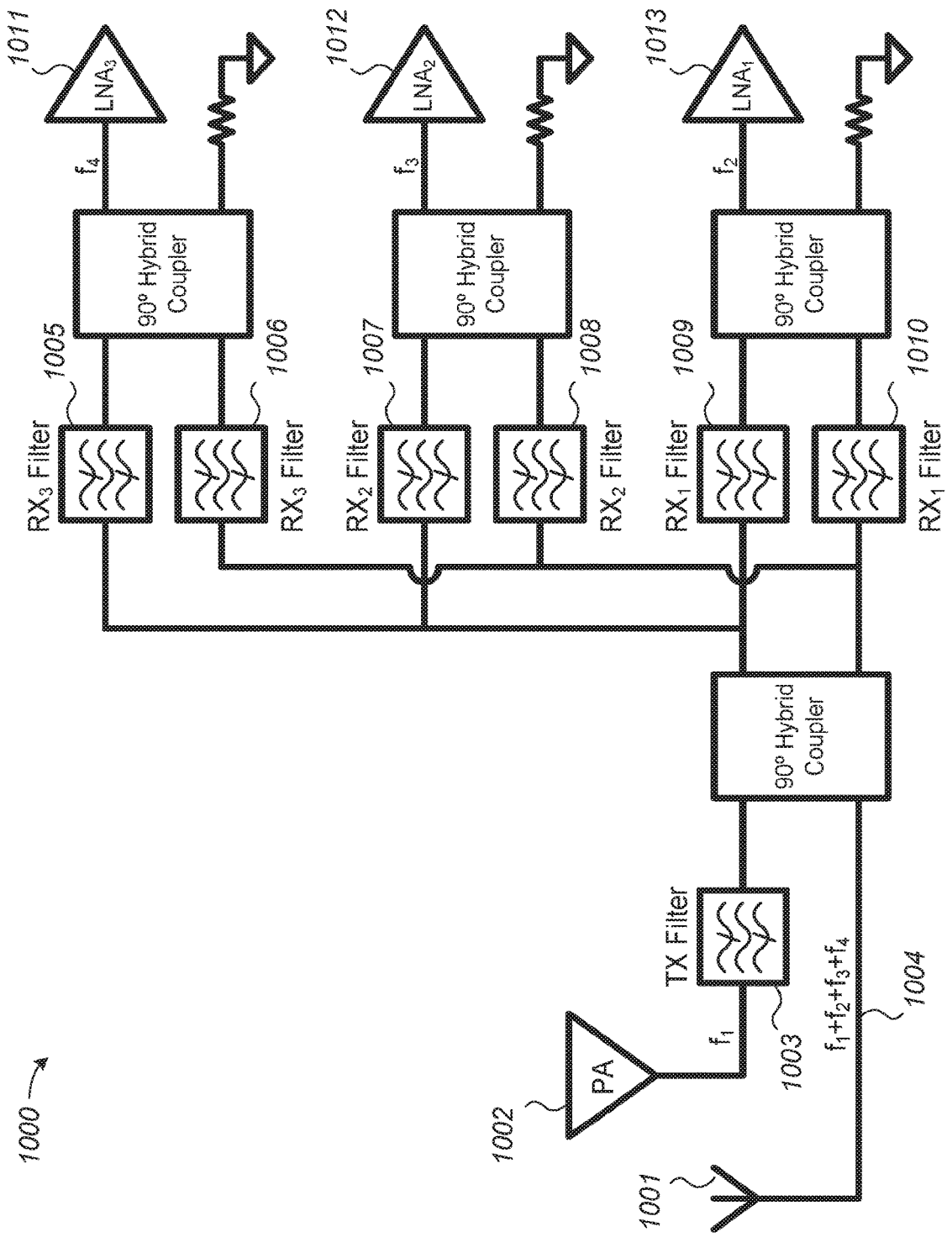
FIG. 10 illustrates an exemplary application for an embodiment of a multiplexer according to the present disclosure that supports four frequency bands.

FIG. 10 illustrates an exemplary application of the present disclosure where a multiplexer, such as a quadplexer 1000, is used in the front-end of a wireless communication system that supports FDD and receive carrier aggregation. In this exemplary application, frequency band $f_1$ is designated as transmit frequency band and frequency bands $f_2$, $f_3$, and $f_4$ are designated as receive frequency bands. A common port 1004 is connected to an antenna interface 1001 supporting all four frequency bands. In some embodiments, the LNAs 1011, 1012, and 1013 are realized monolithically in one chip, or may be part of an integrated multi-band transceiver.

Figure 11:
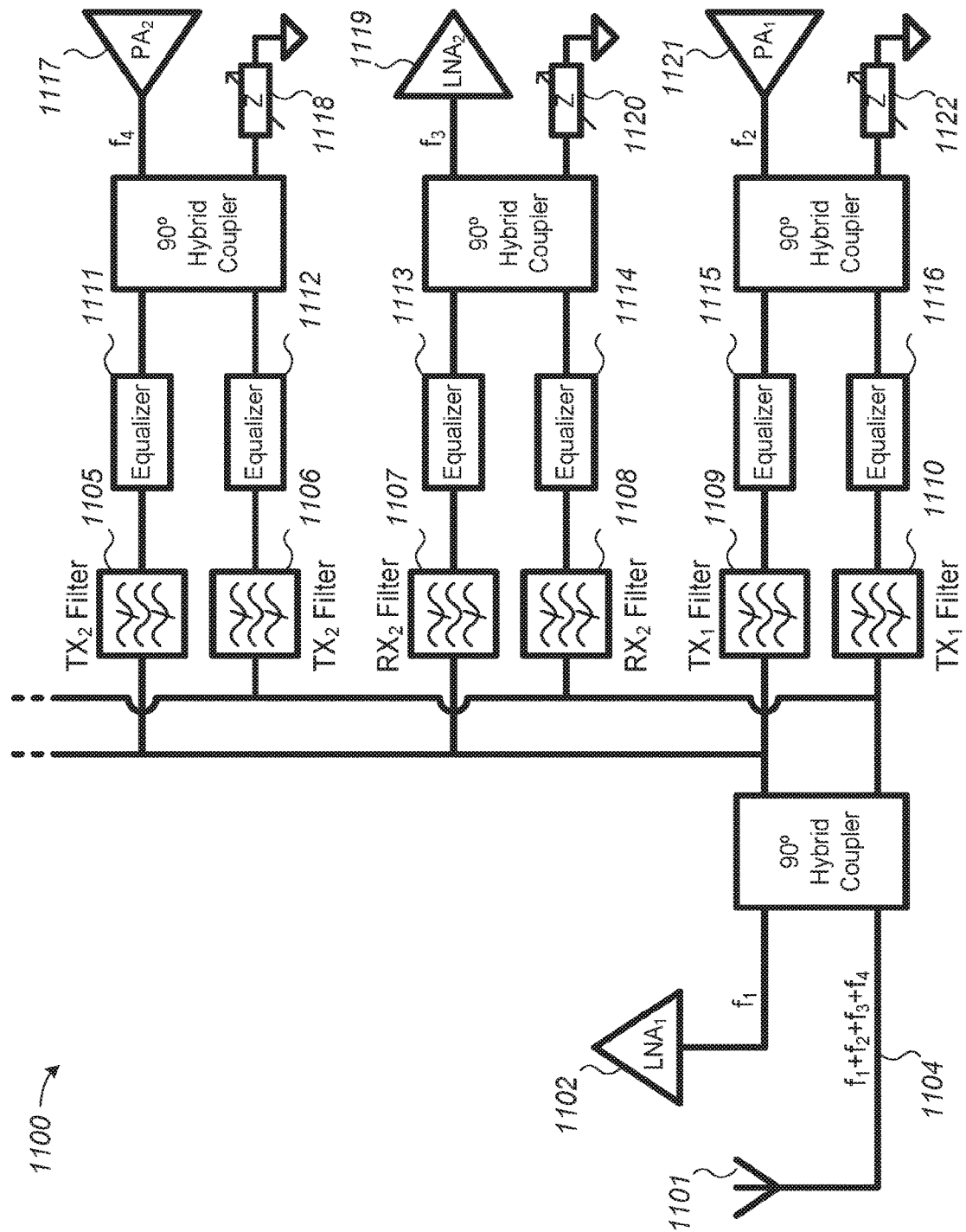
FIG. 11 illustrates an exemplary application for an embodiment of a multiplexer according to the present disclosure that supports four or more frequency bands.

FIG. 11 illustrates another exemplary application of the present disclosure where a multiplexer 1100 is used in a front-end of a wireless communication system that supports FDD, receive carrier aggregation, and transmit carrier aggregation. In this exemplary application, frequency bands $f_2$ and $f_4$ are designated as transmit frequency bands and frequency bands $f_1$ and $f_3$ are designated as receive frequency bands. A common port 1104 is connected to an antenna interface 1101 supporting all four frequency bands. In some embodiments, LNA 1102 and LNA 1119 are realized monolithically in one chip, or may be part of an integrated multi-band transceiver.

FIG. 10 and FIG. 11 illustrate only two of the embodiments according to the present disclosure for which the multiplexers may be used in the front-end of a wireless communication system that supports FDD and/or carrier aggregation. Transmit and receive frequency bands may be designated to any of the multiplexer ports depending on the application. Various considerations may be considered in determining port designations such as insertion loss, power handling, linearity, and isolation.

Figure 12A:
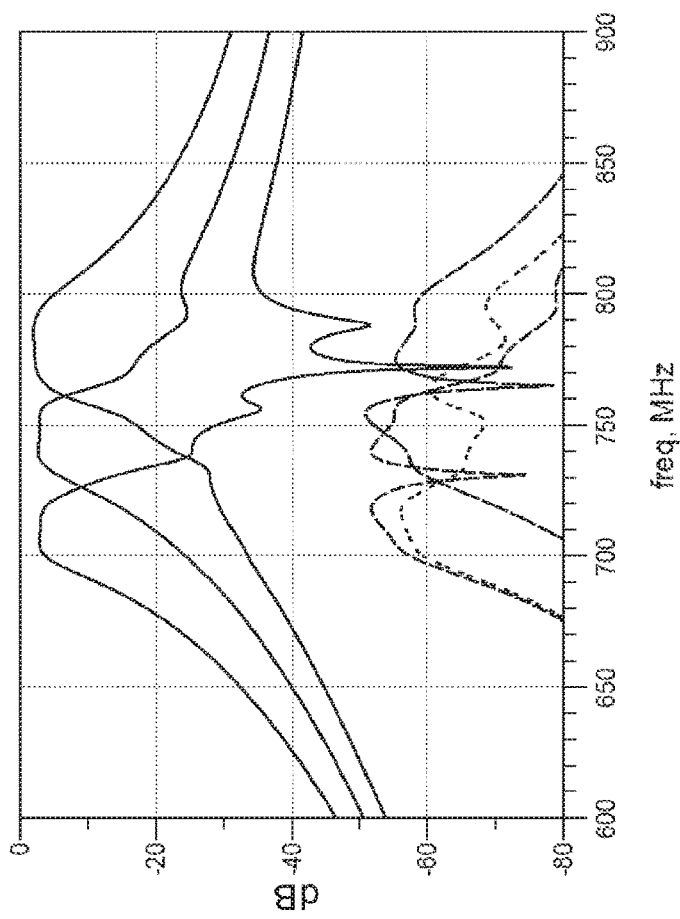
FIG. 12A illustrates an embodiment of a frequency response of a multiplexer according to the present disclosure that supports three frequency bands.

FIG. 12A illustrates a representative graph showing the frequency response of an embodiment of a multiplexer (e.g., a triplexer) according to the present disclosure that supports three frequency bands (e.g., an embodiment shown in FIG. 5A). The graph 1200a shows the S-parameters of an exemplary hybrid-coupler-based multiplexer realized using commercially available components. The solid lines correspond to the transfer functions from the common port to respective single band ports (e.g., in FIG. 5A, from port 501 to ports 502, 511, and 513). The dotted and dashed lines correspond to transfer functions between respective pairs of single band ports (e.g., in FIG. 5A, pairs of ports 502, 511, and 513). It can be seen that a low insertion loss (solid lines) and high port-to-port isolation (dotted and dashed lines) have been achieved.

Figure 12B:
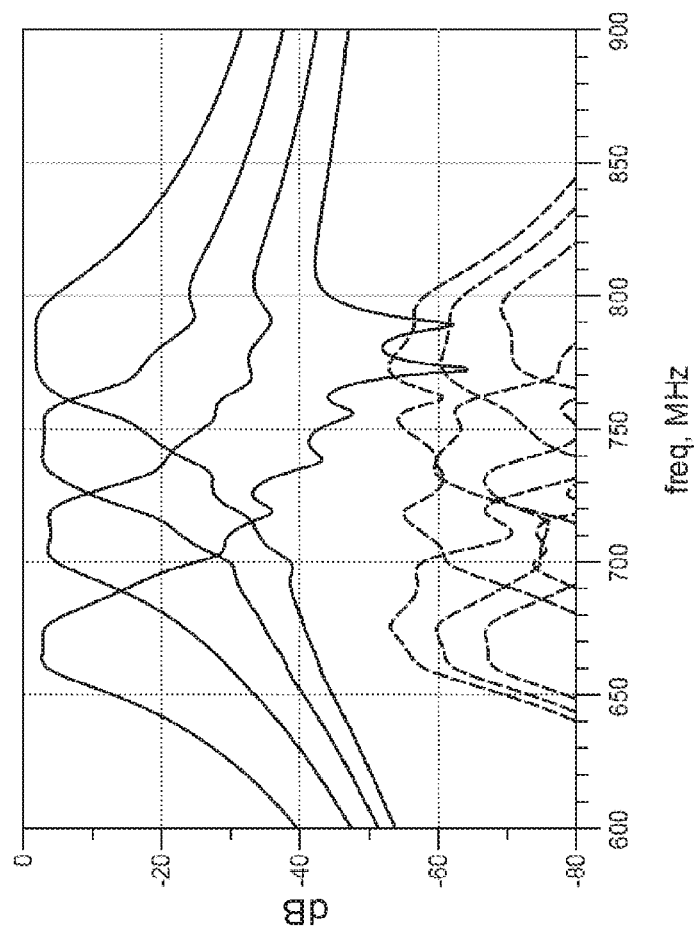
FIG. 12B illustrates an embodiment of a frequency response of a multiplexer according to the present disclosure that supports four frequency bands.

FIG. 12B illustrates a representative graph showing the frequency response of an embodiment of a multiplexer (e.g., a quadplexer) according to the present disclosure that supports four frequency bands (e.g., an embodiment shown in FIG. 6). The graph 1200b shows the S-parameters of an exemplary hybrid-coupler-based multiplexer realized using commercially available components. The solid lines correspond to the transfer functions from the common port to respective single band ports. The dashed lines correspond to transfer functions between respective pairs of single band ports. It can be seen that a low insertion loss (solid lines) and high port-to-port isolation (dashed lines) have been achieved.

Figure 12C:
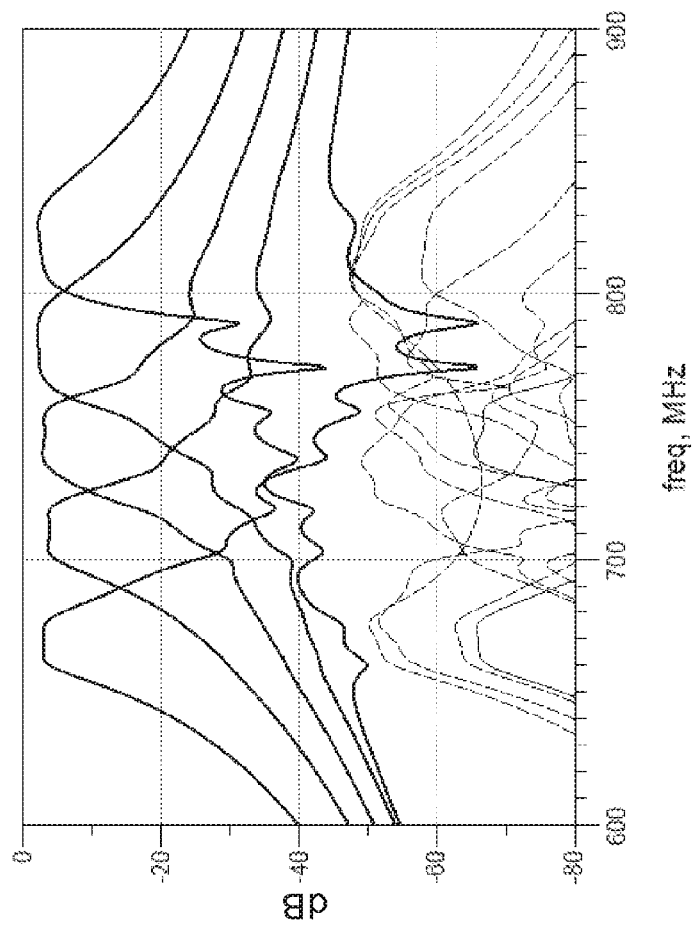
FIG. 12C illustrates an embodiment of a frequency response of a multiplexer according to the present disclosure that supports five frequency bands.

FIG. 12C illustrates a representative graph showing the frequency response of an embodiment of a multiplexer according to the present disclosure that supports five bands (e.g., an embodiment shown in FIG. 8). The graph 1200c shows the S-parameters of the disclosed hybrid coupler based multiplexer realized using commercially available components. The solid lines correspond to the transfer functions from the common port to respective single band ports. The dashed lines correspond to transfer functions between respective pairs of single band ports. It can be seen that a low insertion loss (solid lines) and high port-to-port isolation (dashed lines) have been achieved.

In some embodiments, one or more of the QHCs in the RF multiplexers according to the present disclosure may be realized in an integrated passive device (IPD) technology, or in a low temperature co-fired ceramic (LTCC) technology, or on a printed circuit board (PCB). In some embodiments, one or more of the filters may be stacked over one or more of the QHCs.

Some embodiments of RF multiplexers according to the present disclosure may be used or included in hand portable devices supporting wireless communications such as, for example, a cellular phone, a mobile phone, a mobile cellular device, a mobile wireless communication device, a smartphone, a tablet, a laptop, a smartwatch, etc. Some embodiments of RF multiplexers according to the present disclosure may be used or included in devices supporting the wireless communication infrastructure such as base stations (including macro-, micro-, pico-, and femto-base stations), repeaters, etc. Some embodiments of RF multiplexers according to the present disclosure enable compact multiband, multi-standard wireless communication devices, wireless communication devices that support carrier aggregation and FDD. Some embodiments of RF multiplexers according to the present disclosure enable multi-antenna wireless communication devices.

Other embodiments of the present disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for hybrid-coupler-based RF multiplexers.

Accordingly, aspects of the present disclosure may be realized in hardware, software, or a combination of hardware and software. The present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A radio frequency multiplexer, comprising:
a plurality of ports including a common port, a first port for a first frequency band, a second port for a second frequency band, and a third port for a third frequency band;
a plurality of quadrature hybrid couplers (QHCs) including a first QHC, a second QHC, and a third QHC;
a plurality of pairs of filters including a first pair of filters and a second pair of filters, wherein:
the first pair of filters are coupled between the first QHC and the second QHC, and are configured to pass the second frequency band and not pass the first frequency band and the third frequency band;
the second pair of filters are coupled between the first QHC and the third QHC, and are configured to pass the third frequency band and not pass the first frequency band and the second frequency band;
the first QHC, the first pair of filters, and the second QHC are configured to separate the first frequency band from the common port to the first port, and separate the second frequency band from the common port to the second port; and
the first QHC, the second pair of filters, and the third QHC are configured to separate the first frequency band from the common port to the first port, and separate the third frequency band from the common port to the third port;
a first pair of equalizers coupled between the first pair of filters and the second QHC; and
a first pair of impedance matching networks coupled between the first QHC and the first pair of filters.

2. The radio frequency multiplexer of claim 1 further comprising an additional filter coupled between the first port and the first QHC, and configured to pass the first frequency band.

3. The radio frequency multiplexer of claim 1 further comprising a second pair of equalizers coupled between the second pair of filters and the third QHC.

4. The radio frequency multiplexer of claim 3 further comprising a second pair of impedance matching networks coupled between the first QHC and the second pair of filters.

5. The radio frequency multiplexer of claim 4 further comprising an additional filter coupled to the first port and configured to pass the first frequency band.

6. The radio frequency multiplexer of claim 4 further comprising a first termination resistor coupled between the second QHC and ground, and a second termination resistor coupled between the third QHC and ground.

7. The radio frequency multiplexer of claim 4 further comprising a first tunable or variable impedance coupled between the second QHC and ground, and a second tunable or variable impedance coupled between the third QHC and ground.

8. The radio frequency multiplexer of claim 3 further comprising an additional filter coupled to the first port and configured to pass the first frequency band.

9. The radio frequency multiplexer of claim 3 further comprising a first termination resistor coupled between the second QHC and ground, and a second termination resistor coupled between the third QHC and ground.

10. The radio frequency multiplexer of claim 3 further comprising a first tunable or variable impedance coupled between the second QHC and ground, and a second tunable or variable impedance coupled between the third QHC and ground.

11. The radio frequency multiplexer of claim 1 further comprising a first termination resistor coupled between the second QHC and ground, and a second termination resistor coupled between the third QHC and ground.

12. The radio frequency multiplexer of claim 1 further comprising a first tunable or variable impedance coupled between the second QHC and ground, and a second tunable or variable impedance coupled between the third QHC and ground.

13. The radio frequency multiplexer of claim 1, wherein the radio frequency multiplexer is included in a front-end of a wireless communication system that supports carrier aggregation.

14. The radio frequency multiplexer of claim 1, wherein the radio frequency multiplexer is included in a front-end of a wireless communication system that supports frequency division duplexing.

15. The radio frequency multiplexer of claim 1, wherein the radio frequency multiplexer is included in a front-end of a multiband communication system.

16. The radio frequency multiplexer of claim 1, wherein the radio frequency multiplexer is included in a hand portable device supporting wireless communication.

17. The radio frequency multiplexer of claim 1, wherein the radio frequency multiplexer is included in a base station supporting a wireless communication infrastructure.

18. The radio frequency multiplexer of claim 1, wherein the radio frequency multiplexer is included in a repeater supporting a wireless communication infrastructure.

19. The radio frequency multiplexer of claim 1, wherein the plurality of pairs of filters include one or more of surface acoustic wave (SAW) filters and bulk acoustic wave (BAW) filters.

* * * * *